United States Patent
Fujii et al.

(10) Patent No.: US 9,221,988 B2
(45) Date of Patent: Dec. 29, 2015

(54) INK FOR INKJET, INKJET RECORDING METHOD, INKJET RECORDER AND INK RECORDED MATTER

(71) Applicants: Hidetoshi Fujii, Shizuoka (JP); Hiroshi Gotou, Shizuoka (JP)

(72) Inventors: Hidetoshi Fujii, Shizuoka (JP); Hiroshi Gotou, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/473,071

(22) Filed: Aug. 29, 2014

(65) Prior Publication Data

US 2015/0077480 A1    Mar. 19, 2015

(30) Foreign Application Priority Data

Sep. 13, 2013  (JP) ................................ 2013-190584
Jun. 17, 2014  (JP) ................................ 2014-124621

(51) Int. Cl.
  *B41J 2/01*        (2006.01)
  *C09D 11/38*       (2014.01)
  (Continued)

(52) U.S. Cl.
  CPC .  *C09D 11/38* (2013.01); *B41J 2/01* (2013.01); *B41J 2/2107* (2013.01); *B41J 2/40* (2013.01); *C09D 11/322* (2013.01); *C09D 11/40* (2013.01)

(58) Field of Classification Search
  CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
  USPC ................. 347/100, 95, 96, 101, 102, 20, 21; 106/31.6, 31.13, 31.27; 523/160, 161
  See application file for complete search history.

(56) References Cited

U.S. PATENT DOCUMENTS

2008/0233363 A1    9/2008  Goto
2009/0098312 A1    4/2009  Goto et al.
(Continued)

FOREIGN PATENT DOCUMENTS

JP    2008-163238    7/2008
JP    2008-285605    11/2008
(Continued)

OTHER PUBLICATIONS

U.S. Appl. No. 14/348,794, filed Oct. 12, 2012.
(Continued)

*Primary Examiner* — Manish S Shah
(74) *Attorney, Agent, or Firm* — Oblon, McClelland, Maier & Neustadt, L.L.P.

(57) ABSTRACT

An ink for inkjet includes water, a hydrosoluble organic material and a hydrodispersible colorant. The ink satisfies the following requirements (A) to (C):
  (A) the ink includes the hydrosoluble organic material in an amount of from 35 to 60% by weight;
  (B) the hydrosoluble organic material is 3-methoxy-1-butanol; and
  (C) the hydrodispersible colorant is a modified pigment modified with a geminal bisphosphonic acid group or a geminal bisphosphonic acid salt group.

11 Claims, 4 Drawing Sheets

(51) Int. Cl.
*B41J 2/40* (2006.01)
*B41J 2/21* (2006.01)
*C09D 11/322* (2014.01)
*C09D 11/40* (2014.01)

(56) References Cited

U.S. PATENT DOCUMENTS

| | | | |
|---|---|---|---|
| 2009/0176070 A1 | 7/2009 | Goto et al. | |
| 2010/0175585 A1* | 7/2010 | Liu et al. | 106/31.6 |
| 2010/0295891 A1 | 11/2010 | Goto et al. | |
| 2011/0057981 A1 | 3/2011 | Aruga et al. | |
| 2011/0310166 A1 | 12/2011 | Namba et al. | |
| 2011/0318543 A1 | 12/2011 | Goto | |
| 2012/0098883 A1 | 4/2012 | Matsuyama et al. | |
| 2012/0128949 A1 | 5/2012 | Goto | |
| 2012/0176455 A1* | 7/2012 | Ohta et al. | 347/102 |
| 2012/0207983 A1 | 8/2012 | Matsuyama et al. | |
| 2012/0227619 A1* | 9/2012 | Koganehira et al. | 106/31.13 |
| 2012/0293582 A1 | 11/2012 | Goto et al. | |
| 2012/0320137 A1 | 12/2012 | Fujii et al. | |
| 2013/0002776 A1 | 1/2013 | Nagashima et al. | |
| 2013/0065028 A1 | 3/2013 | Fujii et al. | |
| 2013/0070017 A1 | 3/2013 | Fujii et al. | |
| 2013/0071637 A1 | 3/2013 | Matsuyama et al. | |
| 2013/0101814 A1 | 4/2013 | Gotou et al. | |
| 2013/0113860 A1 | 5/2013 | Gotou et al. | |
| 2013/0143008 A1 | 6/2013 | Gotou et al. | |
| 2013/0155145 A1 | 6/2013 | Gotou et al. | |
| 2013/0169724 A1 | 7/2013 | Gotou | |
| 2013/0176369 A1 | 7/2013 | Gotou et al. | |
| 2013/0194343 A1 | 8/2013 | Yokohama et al. | |
| 2013/0194344 A1 | 8/2013 | Yokohama et al. | |
| 2013/0321525 A1 | 12/2013 | Fujii et al. | |
| 2013/0323474 A1 | 12/2013 | Gotou et al. | |
| 2014/0002539 A1 | 1/2014 | Goto et al. | |
| 2014/0069295 A1 | 3/2014 | Fujii et al. | |
| 2014/0198160 A1 | 7/2014 | Harada et al. | |
| 2014/0204156 A1 | 7/2014 | Gotou | |

FOREIGN PATENT DOCUMENTS

| | | |
|---|---|---|
| JP | 2008-303380 | 12/2008 |
| JP | 2009-155662 | 7/2009 |
| JP | 2012-245721 | 12/2012 |

OTHER PUBLICATIONS

U.S. Appl. No. 14/327,817, filed Jul. 10, 2014.

* cited by examiner

INK FOR INKJET, INKJET RECORDING METHOD, INKJET RECORDER AND INK RECORDED MATTER

CROSS-REFERENCE TO RELATED APPLICATIONS

This patent application is based on and claims priority pursuant to 35 U.S.C. §119 to Japanese Patent Applications Nos. 2013-190584 and 2014-124621, filed on Sep. 13, 2013 and Jun. 17, 2014, respectively, in the Japan Patent Office, the entire disclosure of which is hereby incorporated by reference herein.

BACKGROUND

1. Technical Field

The present invention relates to an ink for inkjet used in recorders using inkjet methods such as copiers, printers and facsimiles; and an inkjet recording method, an inkjet recorder and an ink recorded matter using the ink for inkjet.

2. Description of the Related Art

Having a process simpler than those of other recording methods, the inkjet recoding method produces full-color images with ease and has an advantage of producing high-resolution images even with a simple apparatus. Dye inks in which various hydrosoluble dyes are dissolved in water or mixed liquids formed of water and hydrosoluble moisturizers are used as the ink for inkjet.

Recently, needs for high-speed printing have been increasing, and when an aqueous ink is printed on a hardly water-absorbable print paper, there are problems of color bleeding and beading (solid images have uneven image density).

In order to prevent the ink from bleeding and beading, various methods are thought, such as a method of coating a pre-coating liquid aggregating a pigment or increasing viscosity of the ink on a paper to aggregate the ink drop instantly when landing on the paper, and a method of adding a resin in the ink to increase viscosity thereof on the paper.

However, a printer needs an extra device of applying the pre-coating liquid in the pre-coating method, which causes an extra cost. The method of increasing viscosity may cause problems of ink storage stability and discharge stability (intermittent dischargeability) of inkjet head.

SUMMARY

Accordingly, a need exist for an ink free from bleeding and beading when applied on a hardly water-absorbable print paper, and having storage stability and assuring reliability of the inkjet head.

Another object of the present invention is to provide an ink cartridge containing the ink.

A further object of the present invention is to provide an inkjet recording method using the ink.

Another object of the present invention is to provide an inkjet recorder using the ink.

A further object of the present invention is to provide an ink recorded matter using the ink.

These objects and other objects of the present invention, either individually or collectively, have been satisfied by the discovery of an ink for inkjet, including water, a hydrosoluble organic material and a hydrodispersible colorant, wherein the ink satisfies the following requirements (A) to (C):

(A) the ink comprises the hydrosoluble organic material in an amount of from 35 to 60% by weight;

(B) the hydrosoluble organic material is 3-methoxy-1-butanol; and (C) the hydrodispersible colorant is a modified pigment modified with a geminal bisphosphonic acid group or a geminal bisphosphonic acid salt group.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
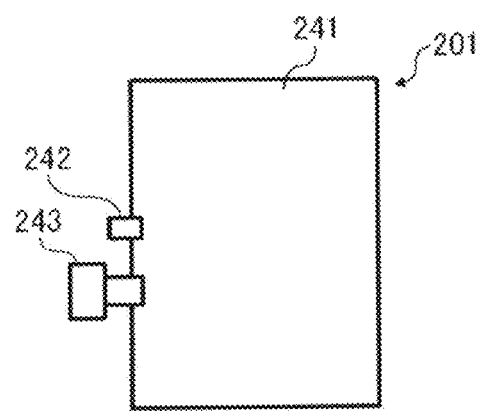
FIG. 1 is a schematic view illustrating an embodiment of ink bag of the ink cartridge of the present invention.

The present invention provides an ink free from bleeding and beading when applied on a hardly water-absorbable print paper, and having storage stability and assuring reliability of the inkjet head.

The ink for inkjet of the present invention includes at least water, a hydrosoluble organic material and a hydrodispersible colorant, and further includes other components such as a defoamer and a hydrodispersible resin when necessary.

The hydrosoluble organic material is soluble in water and dissolved in ink at 15 to 35° C. Examples thereof include hydrosoluble moisturizers, hydrosoluble polymers, surfactants, penetrants, antirust agents, antifungal agents and dyes. The hydrosoluble organic material does not include organic pigments, inorganic pigments, resin compounds which are not dissolved but dispersed in an aqueous phase of ink.

The content of the hydrosoluble organic material is preferably from 35 to 60% by weight in terms of discharge reliability and prevention of curling.

<Moisturizer>

In the present invention, the moisturizer is a hydrosoluble organic material having a high moisture absorbency. When added to ink, the moisturizing ink remains in ink or on the surface of a recording medium, thereby subduing evaporation of moisture.

As a result of investigation of such moisturizers, the present inventors have found that an ink containing 3-methoxy-1-butanol has offset resistance. Further, a combination of 3-methoxy-1-butanol and a modified pigment modified with a geminal bisphosphonic acid group or a geminal bisphosphonic acid salt group prevents an ink from bleeding and beading.

An ink preferably includes 3-methoxy-1-butanol in an amount of from 10 to 60% by weight, and more preferably from 15 to 40% by weight.

An ink including not only 3-methoxy-1-butanol but also at least one of 1,3-butane diol, 3-methyl-1,3-butane diol. 1,2-butane diol, 1,2-pentane diol, 2,3-butane diol, 3-methyl-3-hydroxymethyl oxetane has good intermittent dischargeability.

An ink preferably includes 3-butane diol, 3-methyl-1,3-butane diol. 1,2-butane diol, 1,2-pentane diol, 2,3-butane diol, 3-methyl-3-hydroxymethyl oxetane in an amount of from 1 to 50% by weight, and more preferably from 5 to 40% by weight.

Other examples of the moisturizers include polyols, polyol alkyl ethers, polyol aryl ethers, nitrogen-containing heterocyclic compounds, amides, amines, sulfur-containing compounds, propylene carbonate, ethylene carbonate, and sugar. Specific examples thereof include, but are not limited to, 1,2,3-butane triol (boiling point: 175° C./33 hPa), 1,2,4-butane triol (boiling point: 190 to 191° C./24 hPa), glycerin (boiling point: 290° C.), diglycerin (boiling point: 270° C./20 hPa), triethylene glycol (boiling point: 285° C.), tetraethylene glycol (boiling point: 324 to 330° C.), diethylene glycol (boiling point: 245° C.), β-methoxy-N,N-dimethyl propionamide (boiling point: 216° C.), 2-pyrolidone (boiling point: 245° C.), and 1,3-dimethyl-25-imidazoline (boiling point: 225° C.).

In addition, the followings can also be used.

3-methyl-1,3-butannediol (bp: 203° C.), isobutyl diglycol (bp: 220° C.), tripropylene glycol monomethyl ether (boiling point: 242° C.), 2-(2-isoropyl oxyethoxy)ethanol (boiling point: 207° C.), isopropyl glycol (boiling point: 142° C.), diethyl diglycol (boiling point: 189° C.), propyl propylene glycol (boiling point: 150° C.), tributyl citrate (boiling point: 234° C.), propyl propylene diglycol (boiling point: 220° C.), butyl propylene glycol (boiling point: 170° C.), butyl propylene diglycol (boiling point: 212° C.), methyl propylene glycol acetate (boiling point: 146° C.), triethylene glycol dimethyl ether (boiling point: 216° C.), N. N-dimethyl acrylamide (boiling point: 171° C.), N,N-diethyl acrylamide (boiling point: 56° C./3 mmHg), dipropylene glycol (boiling point: 232° C.), 1,5-pentane diol (boiling point: 242° C.), propylene glycol (boiling point: 187° C.), 2-methyl-2,4-pentane diol (boiling point: 197° C.), ethylene glycol (boiling point: 196 to 198° C.), tripropylene glycol (boiling point: 267° C.), hexylene glycol (boiling point: 197° C.), polyethylene glycol (viscous liquid to solid), polypropylene glycol (boiling point: 187° C.), 1,6-hexane diol (boiling point: 253260° C.), and 1,2,6-hexane triol (boiling point: 178° C.).

Specific examples of the polyol alkyl ethers include, but are not limited to, ethylene glycol monoethyl ether (boiling point: 135° C.), ethylene glycol monobutyl ether (boiling point: 171° C.), diethylene glycol monomethyl ether (boiling point: 194° C.), diethylene glycol monoethyl ether (boiling point: 197° C.), diethylene glycol monobutyl ether (boiling point: 231° C.), ethylene glycol mono-2-ethyl hexyl ether (boiling point: 229° C.), and propylene glycol monoethyl ether (boiling point: 132° C.).

Specific examples of the polyol aryl ethers include, but are not limited to, ethylene glycol monophenyl ether (boiling point: 237° C.) and ethylene glycol monobenzyl ether. Specific examples of the nitrogen-containing heterocyclic compounds include, but are not limited to, N-methyl-2-pyrolidone (boiling point: 202° C.), 1,3-dimethyl-2-imidazolidinone (boiling point: 226° C.), ε-caprolactam (boiling point: 270° C.), and γ-butylolactone (boiling point: 204 to 205° C.).

Specific examples of the amides include, but are not limited to, formamide (boiling point: 210° C.), N-methyl formamide (boiling point: 199 to 201° C.), N, N-dimethylformamide (boiling point: 153° C.), and N, N-diethylformamide (boiling point: 176 to 177° C.).

Specific examples of the amines include, but are not limited to, monoethanol amine (boiling point: 170° C.), diethanol amine (boiling point: 268° C.), triethanol amine (boiling point: 360° C.), N,N-dimethyl monoethanol amine (boiling point: 139° C.), N-methyl diethanol amine (boiling point: 243° C.), N-methylethanol amine (boiling point: 159° C.), N-phenyl ethanol amine (boiling point: 282 to 287° C.), and 3-aminopropyl diethyl amine (boiling point: 169° C.).

Specific examples of the sulfur-containing compounds include, but are not limited to, dimethyl sulphoxide (boiling point: 139° C.), sulfolane (boiling point: 285° C.), and thiodiglycol (boiling point: 282° C.).

Sugar groups are also preferable as other solid aqueous organic solvents.

Specific examples of the sugar groups include, but are not limited to, monosaccharides, disaccharides, oligosaccharides (including trisaccharides and tetrasaccharides), and polysaccharides. Specific examples thereof include, but are not limited to, glucose, mannose, fructose, ribose, xylose, arabinose, galactose, maltose, cellobiose, lactose, saccharose, trehalose, and maltotriose.

Polysaccharides represent sugar in a broad sense and contain materials that are present widely in nature, for example, α-cyclodextrine and cellulose. In addition, specific examples of derivatives of these sugar groups include, but are not limited to, reducing sugars (for example, sugar alcohols (represented by $HOCH_2(CHOH)nCH_2OH$, where n represents an integer of from 2 to 5) of the sugar groups specified above, oxidized sugars (e.g., aldonic acid and uronic acid), amino acid, and thio acid. Among these, sugar alcohols are preferable and specific examples thereof include, but are not limited to, maltitol and sorbit.

<Colorant>

Next, the modified pigment used in the present invention is explained.

The surface of the modified pigment is modified with a geminal bisphosphonic acid group or a geminal bisphosphonic acid salt group, and the modified pigment has hydrodispersibility even without a dispersant. Typically, it is often called a self-dispersible pigment.

Inorganic pigments and organic pigments can be used as the pigment. For the purpose of controlling color tone, a dye may be included in the inkjet ink in the range not impairing the weatherability.

Specific examples of the inorganic pigments include titanium oxide, iron oxide, calcium carbonate, barium sulfate, aluminum hydroxide, barium yellow, cadmium red, chrome yellow and carbon black, etc. Among them, the carbon black is preferably used. The carbon black is produced by known methods such as a contact method, a furnace method, and a thermal method.

Specific examples of the carbon black include, but are not limited to, channel black, furnace black, gas black and lamp black such as Regal (trademark), Black Pearls (trademark), Elftex (trademark), Monarch (trademark), Mogul (trademark); and carbon black under the trademark of Vulcan available from Cabot Corp. such as Black Pearls (trademark) 2000, Black Pearls (trademark) 1400, Black Pearls (trademark) 1300, Black Pearls (trademark) 1100, Black Pearls (trademark) 1000, Black Pearls (trademark) 900, Black Pearls (trademark) 880, Black Pearls (trademark) 800, Black Pearls (trademark) 700, Black Pearls (trademark) 570 and Black Pearls (trademark) L.

Specific examples of the organic pigment include azo pigments, polycyclic pigments, dye chelate, a nitro pigment, a nitroso pigment, aniline black, etc. Among them, the azo pigments and the polycyclic pigments are preferably used. Specific examples of the azo pigments include azo lake, an insoluble azo pigment, a condensed azo pigment, a chelate azo pigment, etc. Specific examples of the polycyclic pigments include a phthalocyanine pigment, a perylene pigment, a perinone pigment, an anthraquinone pigment, a quinacridon pigment, a dioxazine pigment, an indigo pigment, a thioindigo pigment, an iso-indolinone pigment, a quinophtharone pigment, etc. Specific examples of the dye chelate include basic dye chelate, acid dye chelate, etc.

Specific examples of the organic pigment include C.I. Pigment Yellow 1, 3, 12, 13, 14, 17, 24, 34, 35, 37, 42 (yellow oxide), 53, 55, 74, 81, 83, 95, 97, 98, 100, 101, 104, 408, 109, 110, 117, 120, 128, 138, 150, 151, 153, 183; C.I. Pigment Orange 5, 13, 16, 17, 36, 43, 51; C.I. Pigment Red 1, 2, 3, 5, 17, 22, 23, 31, 38, 48:2 (Parmanent Red 2B(Ca)), 48:3, 48:4, 49:1, 52:2, 53:1, 57:1 (brilliant carmine 6B), 60:1, 63:1, 63:2, 64:1, 81, 83, 88, 101 (iron red), 104, 105, 106, 108 (cadmium red), 112, 114, 122 (quinacridon magenta), 123, 146, 149, 166, 168, 170, 172, 177, 178, 179, 185, 190, 193, 209, 219; C.I. Pigment Violet 1 (rhodamine lake), 3, 5:1, 16, 19, 23, 38; C.I. Pigment Blue 1, 2, 15, 15:1, 15:2, 15:3 (phthalocyanine blue), 16, 17:1, 56, 60, 63; and C.I. Pigment Green 1, 4, 7, 8, 10, 17, 18, 36.

The pigment may be oxidized with an oxidant to introduce an ionic group and ionizable group on the surface thereof.

The pigment preferably has ionizability and is preferably charged anionically.

Specific examples of anionic hydrophilic group include —COOM, —SO$_3$M, —PO$_3$HM, —PO$_3$M$_2$, —SO$_2$NH$_2$, and —SO$_2$NHCOR, where M is alkali metal, ammonium or organic ammonium; and R is a C1-C12 alkyl group, a substituted or unsubstituted phenyl group, or a substituted or unsubstituted naphthyl group. Among them, —COOM, and —SO$_3$M are preferable. In the case where "M" in the aforementioned functional group is alkali metal, examples of such alkali metal include lithium, sodium, and potassium. In the case where "M" in the aforementioned functional group is organic ammonium, examples of such organic ammonium include mono-, di-, or trimethyl ammonium, mono-, di-, or triethyl ammonium, and mono-, di-, or trimethanol ammonium. For attaining a color pigment having an anionic functional group, the anionic functional group (e.g. —COONa) can be introduced to a surface of each particle of the color pigment, for example, by a method in which a color pigment is subjected to oxidation treatment with sodium hypochlorite, a method by sulfonation, or a method to react with diazonium salt.

The pigment preferably has a BET surface area of from about 10 to 1,500 m$^2$/g, more preferably from about 20 to 600 m$^2$/g, and most preferably from 50 to 300 m$^2$/g.

The pigment may be pulverized by, e.g., a ball mil, a jet mill or an ultrasonic process to have a small particle diameter.

The pigment is preferably, e.g., carbon black having a dibutylphthalate (DBP) absorption value of from about 25 to 400 mL/100 g, more preferably from about 30 to 200 mL/100 g, and furthermore preferably from about 50 to 150 mL/100 g.

Next, the surface modification is explained in detail.

The surface of a pigment is modified by adding a geminal bisphosphonic acid group or a geminal bisphosphonic acid salt group to a hydrodispersible colorant. The geminal bisphosphonic acid is a compound having two phosphonic acid groups on the same carbon such as a compound having the following formula (I) or (II):

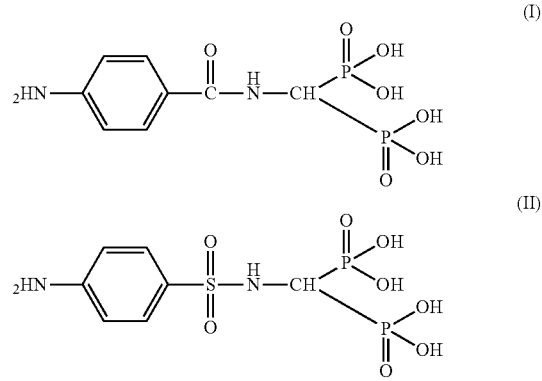

A dispersion including the modified pigment of the present invention is prepared by one of the following general procedures.

The compound having the formula (I) or (II) is reacted with a pigment, and the phosphonic acid group is preferably substituted with alkali metal and organic ammonium to increase dispersibility in water.

<Pigment Surface Modification Process>

(Method A)

Twenty (20) g of carbon black, 20 mmol of the compound having the formula (I) or (II) and 200 mL of ion-exchanged water are mixed by Silverson mixer (6,000 rpm) at room temperature.

When the resultant slurry has a pH higher than 4, 20 mmol of nitric acid are added thereto. Thirty (30) min later, 20 mmol of sodium nitrite dissolved in a small amount of ion-exchanged high-purity water are slowly added thereto. Further, the mixture is heated to have a temperature of 60° C. while stirred for 1 hr. Thus, a modified pigment, i.e., carbon black added with the compound having the formula (I) or (II) is formed. Next, the modified pigment is dispersed in a NaOH aqueous solution to have a pH of 10, and a modified pigment dispersion is prepared 30 min later. The modified pigment dispersion is combined with at least a geminal bisphosphonic acid group or a geminal bisphosphonic acid salt group and ion-exchanged high-purity water are ultrafiltrated with a dialysis membrane, and is further subjected to ultrasonic dispersion to obtain a modified pigment dispersion in which a solid content is condensed.

(Method B)

Process AII 4HV mixer (4 L) is charged with 500 g of dry carbon black, 1 L of ion-exchanged high-purity water, and 1 mol of the compound having the formula (I) or (II). Next, the mixture is strongly mixed at 300 rpm for 10 min while heated to have a temperature of 60° C. Sodium nitrite aqueous solution having a concentration of 20% [1 mol equivalent, based on the compound having the formula (I) or (II)] is added to the mixture for 15 min. The mixture is stirred to be mixed for 3 hrs while heated to have a temperature of 60° C. The reactant is taken out while diluted with 750 mL of ion-exchanged high-purity water. The resultant modified pigment dispersion and ion-exchanged high-purity water are ultrafiltrated with a dialysis membrane, and is further subjected to ultrasonic dispersion to obtain a modified pigment dispersion in which a solid content is condensed. Further, coarse particles are preferably removed by a centrifugal separator, etc. when too many.

The content of the sodium ion in the modified pigment dispersion is measured by an ion meter. Further, the content of phosphorus therein is measured. Further, the volume-average particle diameter ($D_{50}$) of the modified pigment in the dispersion is measured by Microtrac (trademark) particle diameter distribution measurer.

The modified pigment preferably has a volume-average particle diameter ($D_{50}$) of from 0.01 to 0.16 µm in the ink.

The ink for inkjet preferably includes the hydrodispersible colorant in an amount of from 1 to 15% by weight, and more preferably from 2 to 10% by weight in a solid form to have good dischargeability and preferable economic performance.

An ink including a surface-modified pigment dispersion combined at least a geminal bisphosphonic acid group or a geminal bisphosphonic acid sodium salt produces images having high image density. Having good redispersibility after dried, even after printing is paused for long periods and an ink moisture around the inkjet head nozzle vapors, the ink does not block the nozzle and produce quality images with a simple cleaning operation.

Further, the ink has high stability even after stored for a while, prevents its viscosity from increasing when moisture vapors, prevents itself for anchoring on a retainer, and has very good discharge reliability.

The self-dispersible pigment preferably has a volume-average particle diameter ($D_{50}$) of from 0.01 to 0.16 µm in the ink.

—Hydrodispersible Resin—

Hydrodispersible resins have excellent film-forming (image forming) property, water repellency, water-resistance, and weathering properties. Therefore, these are suitable for image recording requiring high water-resistance and high image density.

Specific examples thereof include, but are not limited to, condensation-based resins, addition-based resins, and natural polymers.

Specific examples of the condensation-based resins include, but are not limited to, polyester resins, polyurethane resins, polyepoxy resins, polyamide resins, polyether resins, poly(meth)acrylic resins, acrylic-silicone resins, and fluorine-containing resins.

Specific examples of the addition-based resins include, but are not limited to, polyolefin resins, polystyrene resins, polyvinyl alcohol resins, polyvinyl ester resins, polyacrylic acid resins, and unsaturated carboxylic acid resins.

Specific examples of the natural resins include, but are not limited to, celluloses, rosins, and natural rubber.

Among these, acrylic-silicone resin particulates and fluorine-containing resin particulates are preferable. These can be used alone or in combination.

As the fluorine-containing resins, fluorine-containing resin particulates having fluoro-olefin units are preferable. Among these, fluorine-containing vinyl ether resin particulates formed of fluoro-olefin units and vinyl ether units are particularly preferable.

The hydrodispersible resins can be used as homopolymers or complex resins as copolymers. Any of single phase structure type, core-shell type, and power feed type emulsions is suitable.

A hydrodispersible resin that has a hydrophilic group with self dispersiblity or no dispersibility while dispersibility is imparted to a surfactant or a resin having hydrophilic group can be used as the hydrodispersible resin. Among these, emulsions of resin particles obtained by emulsification polymerization or suspension polymerization of ionomers or unsaturated monomers of a polyester resin or polyurethane resin are most suitable. In the case of emulsification polymerization of an unsaturated monomer, since a resin emulsion is obtained by reaction in water to which an unsaturated monomer, a polymerization initiator, a surfactant, a chain transfer agent, a chelate agent, pH adjusting agent, etc. are added, it is easy to obtain a hydrodispersible resin and change the resin components. Therefore, a hydrodispersible resin having target properties is easily obtained.

Specific examples of the unsaturated monomers include, but are not limited to, unsaturated carboxylic acids, mono-functional or poly-functional (meth)acrylic ester monomers, (meth)acrylic amide monomers, aromatic vinyl monomers, vinyl cyano compound monomers, vinyl monomers, arylated compound monomers, olefin monomers, dien monomers, and oligomers having unsaturated carbon. These can be used alone or in combination. When these are used in combination, resin properties can be easily reformed. The resin properties can be reformed by polymerization reaction and graft reaction using an oligomer type polymerization initiators.

Specific examples of the unsaturated carboxylic acids include, but are not limited to, acrylic acid, methacrylic acid, itaconic acid, fumaric acid, and maleic acid.

Specific examples of the mono-functional (meth)acrylic ester monomers include, but are not limited to, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethyl aminoethyl methacrylate, methacryloxy ethyltrimethyl ammonium salts, 3-methacryloxy propyl trimethoxy silane, methyl acrylate, ethylacrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethyl aminoethyl acrylate, and acryloxy ethyl trimethyl ammonium salts.

Specific examples of poly-functional (meth)acrylic ester monomers include, but are not limited to, ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane diol dimethacrylate, neopentyl glycol dimethacrylate, dipropylene glycol dimethacrylate, polypropylene glycol dimethacrylate, polybutylene glycol dimethacrylate, 2,2'-bis(4-methacryloxy diethoxyphenyl) propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexane diol diacrylate, neopentyl glycol diacrylate, 1,9-nonane diol diacrylate, polypropylene glycol diacrylate, 2,2'-bis(4-acryloxy propyloxyphenyl)propane, 2,2'-bis(4-acryloxy diethoxyphenyl) propane trimethylol propane triacrylate, trimethylol ethane triacrylate, tetramethylol methane triacrylate, ditrimethylol tetraacryalte, tetramethylo methane tetraacrylate, pentaerythritol tetraacrylate, and dipentaerythritol hexaacrylate.

Specific examples of the (meth)acrylic monomers include, but are not limited to, acrylic amides, methacrylic amides, N, N-dimethyl acrylic amides, methylene bis acrylic amides, and 2-acrylic amide-2-methyl propane sulfonates.

Specific examples of the aromatic vinyl monomers include, but are not limited to, styrene, α-methylstyrene, vinyl toluene, 4-t-butyl styrene, chlorostyrene, vinyl anisole, vinyl naphthalene, and divinyl benzene.

Specific examples of the vinyl cyano compound monomers include, but are not limited to, acrylonitrile, and methacrylonitrile.

Specific examples of the vinyl monomers include, but are not limited to, vinyl acetate, vinylidene chloride, vinyl chloride, vinyl ether, vinyl ketone, vinyl pyrrolidone, vinyl sulfonic acid and its salts, vinyl trimethoxy silane, and vinyl triethoxy silane.

Specific examples of the arylated compound monomers include, but are not limited to, aryl sulfonic acid and its salts, aryl amine, aryl chloride, diaryl amine, and diaryl dimethyl ammonium salts.

Specific examples of the olefin monomers include, but are not limited to, ethylene and propylene.

Specific examples of the dien monomers include, but are not limited to, butadiene and chloroprene.

Specific examples of the oligomers having unsaturated carbon include, but are not limited to, styrene oligomers having a methacryloyl group, styrene-acrylonitrile oligomers having a methacryloyl group, methyl methacrylate oligomers having a methacryloyl group, dimethyl siloxane oligomers having a methacryloyl group, and polyester oligomers having an acryloyl group.

Since breaking in molecule chains such as dispersion destruction and hydrolytic cleavage occurs to the hydrodispersible resins in a strong alkali or strong acid environment, pH is preferably from 4 to 12, more preferably from 6 to 11, and furthermore preferably from 7 to 10 in terms of the miscibility with the hydrodispersible coloring agent.

The volume-average particle diameter ($D_{50}$) of the hydrodispersible resin is related to the viscosity of the liquid dispersion. If the composition is the same, the viscosity at the same solid portion increases as the particle diameter decreases. To avoid preparing ink having an excessively high viscosity, the volume-average particle diameter ($D_{50}$) of the hydrodispersible resin is preferably 50 nm or more. In addition, particles having a larger particle diameter than the size of the nozzle mouth of the inkjet head are not usable. When large particles smaller than the nozzle mouth are present in the ink, the discharging property of the ink deteriorates. The volume-average particle diameter ($D_{50}$) of the hydrodispersible resin is preferably 200 nm or less and more preferably 150 nm or less in order not to degrade the discharging property.

In addition, preferably the hydrodispersible resin has a feature of fixing the hydrodispersible coloring agent on a recording medium (typically, paper) and forms a film at room temperature to improve the fixing property of the coloring material. Therefore, the minimum film-forming temperature (MFT) of the hydrodispersible resin is preferably 30° C. or lower. In addition, when the glass transition temperature of the hydrodisdpersible resin is too low (e.g., −40° C. or lower), the viscosity of the resin film tends to increase, thereby causing the obtained image sheet to increase tackiness. Therefore, the glass transition temperature of the hydrodisdpersible resin is preferably −30° C. or higher.

The ink preferably includes the hydrodisdpersible resin in an amount of from 0.5 to 30% by weight, and more preferably from 1 to 25% in a solid form.

—Surfactant—

As the surfactant, it is preferable to use a surfactant that has a low surface tension, a high permeability, and an excellent leveling property without degrading the dispersion stability irrespective of the kind of the coloring agent and the combinational use with the wetting agent. At least a surfactant selected from the group consisting of anionic surfactants, nonionic surfactants, silicone-containing surfactants, and fluorine-containing surfactants is preferable. Of these, silicone-containing surfactants and fluorine-containing surfactants are particularly preferable.

These surfactants may be used alone or in combination.

A fluorine-based surfactant in which the number of carbon atoms replaced with fluorine atoms is from 2 to 16 is preferable and, 4 to 16, more preferable. If the number of carbon atoms replaced with fluorine is from 2 to 16, the capability of decreasing surface tension is high and in addition, storage property is good.

Examples of anionic fluorine surfactants, nonionic fluorine surfactants, amphoteric fluorine surfactants, and oligomeric fluorine surfactants follow.

(1) Anionic Fluorine Surfactants

Specific examples of the anionic fluorine surfactants include, but are not limited to, perfluoroalkyl sulfonic acid compounds, perfluoroalkyl carboxylic acid compounds, etc. Specific examples of the perfluoroalkyl sulfonic acid compounds include, but are not limited to, perfluoroalkyl sulfonic acid and salts of perfluoroalkylsulfonic acid. Specific examples of the perfluoroalkyl carboxylic acid compounds include, but are not limited to, perfluoroalkyl carboxylic acid and salts of perfluoroalkyl carboxylic acid, etc.

Specific examples of the nonionic fluorine surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain, etc.

Specific examples of the perfluoroalkyl phosphoric acid ester compounds include, but are not limited to, perfluoroalkyl phosphoric acid esters and salts of perfluoroalkyl phosphoric acid esters. Specific examples of the polyoxyalkylene ether polymer compounds having a perfluoroalkyl ether group in its side chain include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain, etc.

Counter ions of salts in these fluorine surfactants are, for example, Li, Ha, K, $NH_4$, $NH_3CH_2CH_2CH$, $NH_2(CH_2CH_2OH)_2$, and $NH(CH_2CH_2OH)_3$.

Compounds having the following formulae (4) to (8) are preferably used as the anionic fluorine surfactants.

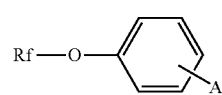

(4)

wherein Rf represents a mixture of a fluorine-containing hydrophobic group having the following formulae (III) and A represents —$SO_3X$, —COOX, or —$PO_3X$, where X represents a counter cation. Specific examples of X include, but are not limited to, Li, Na, K, $NH_4$, $NH_3CH_2CH_2OH$, $NH_2(CH_2CH_2OH)_2$, and $NH(CH_2CH_2OH)_3$.

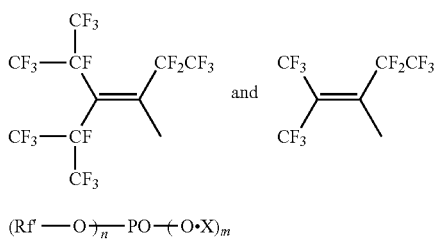

(III)

(5)

wherein Rf' represents a fluorine-containing group having the following formula, X represents the same as above and n is 1 or 2 and m is 2−n.

$$F-(CF_2CF_2)_n-H_2CH_2 \quad (6)$$

wherein n represents an integer of from 3 to 10.

$$Rf'-S-OH_2CH_2-COO.X \quad (7)$$

wherein Rf' and X are the same as above.

$$Rf'-SO_3.X \quad (8)$$

wherein Rf' and X are the same as above.

(2) Nonionic Fluorine Surfactants

Compounds having the following formulae (9), (10-1) and (10-2) are preferably used as the nonionic fluorine surfactants.

$$Rf-O-(CH_2CH_2O)_n-H \quad (9)$$

wherein Rf is the same in the formula (4) and n represents an integer of from 5 to 20.

$$CF_3CF_2(CF_2CF_2)_m-CH_2CH_2O(CH_2CH_2O)_n H \quad (10\text{-}1)$$

wherein m and n represent integers not less than 0, and m is preferably from 0 to 10 and n is preferably from 0 to 40 to impart hydrosolubility.

$$C_nF_{2n+1}-CH_2CH(OH)CH_2-O-(CH_2CH_2O)_a-Y' \quad (10\text{-}2)$$

wherein n represents an integer of from 2 to 6, a represents an integer of from 15 to 50, Y' represents —$C_bH_{2b+1}$ (b is an integer of from 11 to 19) or —$CH_2CH(OH)CH_2-C_dF_{2d+1}$ (d is an integer of from 2 to 6).

Specific examples of the nonionic fluorine surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain, etc. Among these, polyoxyalkylene ether polymer compounds having a perfluoroalkyl ether group in its side chain are particularly preferable because of its low foaming property such as the fluorine surfactants having the formulae (10-1) and (10-2).

Preferred examples of the compounds having the formula (10-2) include the following compounds a) to v) because of having high capability of decreasing surface tension and high permeability.

a) $C_4F_9$—$CH_2CH(OH)CH_2O$—$(CH_2CH_2O)_{21}$—$C_{12}H_{25}$
b) $C_4F_9$—$CH_2CH(OH)CH_2O$—$(CH_2CH_2O)_{25}$—$C_{12}H_{25}$
c) $C_4F_9$—$CH_2CH(OH)CH_2O$—$(CH_2CH_2O)_{30}$—$C_{12}H_{25}$
d) $C_4F_9$—$CH_2CH(OH)CH_2O$—$(CH_2CH_2O)_{20}$—$C_{14}H_{29}$
e) $C_4F_9$—$CH_2CH(OH)CH_2O$—$(CH_2CH_2O)_{30}$—$C_{14}H_{29}$
f) $C_4F_9$—$CH_2CH(OH)CH_2O$—$(CH_2CH_2O)_{20}$—$C_{16}H_{33}$
g) $C_4F_9$—$CH_2CH(OH)CH_2O$—$(CH_2CH_2O)_{23}$—$C_{16}H_{33}$
h) $C_4F_9$—$CH_2CH(OH)CH_2O$—$(CH_2CH_2O)_{25}$—$C_{16}H_{33}$
i) $C_4F_9$—$CH_2CH(OH)CH_2O$—$(CH_2CH_2O)_{3}$—$C_{16}H_{33}$
j) $C_4F_9$—$CH_2CH(OH)CH_2O$—$(CH_2CH_2O)_{40}$—$C_{16}H_{33}$
k) $C_4F_9$—$CH_2CH(OH)CH_2O$—$(CH_2CH_2O)_{20}$—$C_{18}H_{37}$
l) $C_4F_9$—$CH_2CH(OH)CH_2O$—$(CH_2CH_2O)_{30}$—$C_{18}H_{37}$
m) $C_4F_9$—$CH_2CH(OH)CH_2O$—$(CH_2CH_2O)_{40}$—$C_{18}H_{37}$
n) $C_4F_9$—$CH_2CH(OH)CH_2O$—$(CH_2CH_2O)_{23}$—$CH_2CH(OH)CH_2$—$C_4F_9$
o) $C_4F_9$—$CH_2CH(OH)CH_2O$—$(CH_2CH_2O)_{35}$—$CH_2CH(OH)CH_2$—$C_4F_9$
p) $C_4F_9$—$CH_2CH(OH)CH_2O$—$(CH_2CH_2O)_{45}$—$CH_2CH(OH)CH_2$—$C_4F_9$
q) $C_6F_{13}$—$CH_2CH(OH)CH_2O$—$(CH_2CH_2O)_{21}$—$C_{12}H_{25}$
r) $C_6F_{13}$—$CH_2CH(OH)CH_2O$—$(CH_2CH_2O)_{25}$—$C_{12}H_{25}$
s) $C_6F_{13}$—$CH_2CH(OH)CH_2O$—$(CH_2CH_2O)_{30}$—$C_{12}H_{25}$
t) $C_6F_{13}$—$CH_2CH(OH)CH_2O$—$(CH_2CH_2O)_{23}$—$CH_2CH(OH)CH_2$—$C_6F_{13}$
u) $C_6F_{13}$—$CH_2CH(OH)CH_2O$—$(CH_2CH_2O)_{35}$—$CH_2CH(OH)CH_2$—$C_6F_{13}$
v) $C_6F_{13}$—$CH_2CH(OH)CH_2O$—$(CH_2CH_2O)_{45}$—$CH_2CH(OH)CH_2$—$C_6F_{13}$

Among these, a) to c) and n) to v) are more preferably used because of having good compatibility with organic solvents.

(3) Amphoteric Fluorine Surfactant

A compound having the following formula (11) is preferably used as the amphoteric fluorine surfactants.

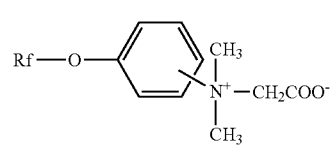

(11)

wherein Rf is the same in the formula (4).

(4) Oligomer Fluorine Surfactant

Compounds having the following formulae (12) and (14) are preferably used as the oligomer fluorine surfactants.

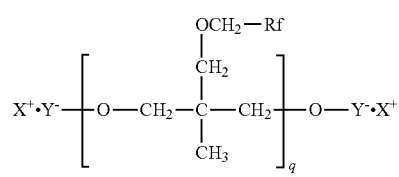

(12)

wherein Rf represents a fluorine-containing group having the following formula (13); X represents a quaternary ammonium group; alkali metals such as sodium and potassium; triethylamine and triethanol amine, Y represents —COO⁻, —SO$_3$⁻, —SO$_4$⁻ and —PO$_4^|$, and q represents an integer of from 1 to 6.

$$F-(CF_2CF_2)_n-CH_2 \quad (13)$$

wherein n represents an integer of from 1 to 4.

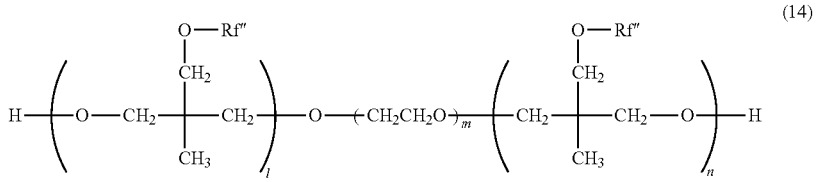

(14)

wherein Rf" represents a perfluoroalkyl group, m represents an integer of from 6 to 26, and each of l and n represents an integer of from 1 to 10.

Specific examples of the products of the fluorine surfactants available from the market include, but are not limited to, Surflon S-111, Surflon S-112, Surflon S-121, Surflon S-131, Surflon S-132, Surflon S-141, and Surflon S-145 (all from ASAHI GLASS CO., LTD.); Fluorad FC-93, FC-95, FC-98, FC-129, FC-135, FC-170C, FC-430, and FC-431 (all from Sumitomo 3M); MegaFac F-470, F-1405, and F-474 (all from DIC Corporation); Zonyl TBS, FSP, FSA, FSN-100, FSN, FSO-100, FSO, FS-300 UR (all from Du Pont Kabushiki Kaisha); FT-110, FT-250, FT-251, FT-400S, FT-150 and FT-400SW (all from Neos Company Limited); and Polyfox PF-136A, PF-156A, PF-151N, PF-154 and PF-159 (from Omnova Solutions Inc.), and UNIDYNE DSN-403N from DAIKIN INDUSTRIES, Ltd. Among these, in terms of improvement on the printing quality, in particular the color property and the uniform dying property on paper, FS-300 of Du Pont Kabushiki Kaisha, FT-110, FT-250, FT-251, FT-400S, FT-150, and FT-400SW of Neos Company Limited, Polyfox PF-151N from Omnova Solutions Inc. and UNIDYNE DSN-403N from DAIKIN INDUSTRIES, Ltd. are particularly preferred.

(Silicone Surfactants)

Specific examples of the silicone surfactants include, but are not limited to, side-chain-modified polydimethylsiloxane, both end-modified polydimethylsiloxane, one end modified polydimethylsiloxane, and side-chain both end modified polydimethylsiloxane. A polyether-modified silicone surfactant which has a polyoxyethylene group and/or a polyoxyethylene polyoxypropylene group is particularly preferable because of its good characteristics as an aqueous surfactant.

Any suitably synthesized surfactant and products thereof available in the market can be also used. Products available in the market are easily obtained by BYK-Chemie Japan Co., Ltd., Shin-Etsu Silicone Co., Ltd., Dow Corning Toray Co., Ltd., etc.

(Anionic Surfactants)

Specific examples of the anionic surfactants include, but are not limited to, polyoxyethylene alkyl ether acetates, dodecyl benzene sulfonates, laurates, and polyoxyethylene alkyl ether sulfates. Marketed products thereof include ECTD-3NEX from Nikko Chemicals Co., Ltd.

(Nonionic Surfactants)

Specific examples of the nonionic surfactants include, but are not limited to, polyoxyethylene alkyl ether, polyoxypropylene polyoxyethylene alkyl ether, polyoxyethylene alkyl esters, polyoxy ethylene sorbitan aliphatic esters, polyoxyethylene alkyl phenyl ethers, polyoxyethylene alkyl amines, and polyoxyethylenealkyl amides.

Marketed products thereof include Softanol EP-7025 from NIPPON SHOKUBAI CO., LTD.

The ink preferably includes the surfactants in an amount of from 0.001 to 5% by weight, and more preferably from 0.05 to 1% by weight in terms of good dischargeability and storage stability.

The ink preferably includes at least one of a non-wettable polyol compound or a glycol ether compound having 8 to 11 carbon atoms as a penetrant. Non-wettablity means a solubility of from 0.2% to 5.0% by weight in water at 25° C.

As the penetrant, a 1,3-diol compound having the following formula (18) is preferable, and 2-ethyl-1,3-hexane diol (having solubility of 4.2% at 25° C.) and 2,2,4-trimethyl-1, 3-pentane diol (having solubility of 2.0% at 25° C.) are particularly preferable.

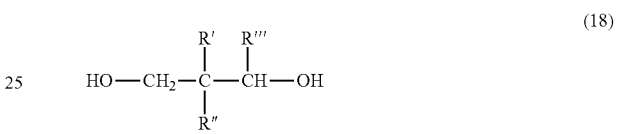

(18)

wherein R' represents a methyl group or an ethyl group; R" represents a hydrogen atom or a methyl group; and R''' represents an ethyl group or a propyl group.

Specific examples of the other non-wettable polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2, 5-hexane diol, and 5-hexene-1,2-diol.

Any other penetrants which can be dissolved in ink and adjusted to have desired characteristics can be used in combination. Specific examples thereof include, but are not limited to, alkyl and aryl ethers of polyols such as diethylene glycol monophenylether, ethylene glycol monophenylether, ethylene glycol monoaryl ether, diethylene glycol monophenyl ether, diethylene glycol monobutyl ether, propylene glycol monobutyl ether, and tetraethylene glycol chlorophenyl ether and lower alcohols such as ethanol.

The ink preferably includes the penetrant in an amount of from 0.1 to 4.0% by weight in terms of better penetration thereof to media and better dot reproducibility.

—Other Components—

There is no specific limit to the selection of the other components. Optionally, pH adjustors, defoamers, antisepsis and anti-fungal agents, chelate reagents, antirust agents, antioxidants, ultraviolet absorbers, oxygen absorbers, and photostabilizers can be used in the ink of the present invention.

<Defoamers>

The defoamer is included in the ink for inkjet of the present invention in a small amount to prevent the ink from foaming. The foaming here means that a liquid wraps air in the form of a thin film. The surface tension and viscosity of the ink for inkjet are involved in generating the foam. Namely, a liquid having high surface tension like water is difficult to foam because of having a force to make the surface area as small as possible. The ink for inkjet having high viscosity and permeability has low surface tension and easily foams. Further, the foams are easy to maintain and difficult to defoam due to viscosity of the ink.

Typically, the defoamers locally decrease the surface tension of a foam film to break foams or intersperse a defoamer insoluble in a foaming liquid on the surface thereof. When a fluorine surfactant noticeably decreasing the surface tension is used as a surfactant in the ink for inkjet, the former defoamer is not used as a rule because of incapable of locally decrease the surface tension of a foam film. Therefore, the latter defoamer insoluble in a foaming liquid is used, which decreases stability of the ink for inkjet.

A defoamer having the following formula (19) does not decrease the surface tension as the fluorine surfactant, but has high compatibility therewith. Therefore, it is thought that the defoamer is efficiently taken in the foam film, and that a difference of the surface tension between the fluorine surfactant and the defoamer locally unbalances the surface of the foam film to break foams.

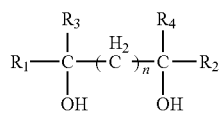

(19)

wherein $R_1$ and $R_2$ independently represent an alkyl group having 3 to 6 carbon atoms; $R_3$ and $R_4$ independently represent an alkyl group having 1 to 62 carbon atoms; and n represents an integer of from 1 to 6.

Preferred examples of the compound having the formula (19) include 2,4,7,9-tetramethyldecane-4,7-diol and 2,5,8,11-tetramethyldodecan-5,8-diol. 2,5,8,11-tetramethyldodecan-5,8-diol is more preferably used because of having defoamability and high compatibility with the ink.

The ink for inkjet preferably includes the defoamer in an amount of from 0.01 to 10% by weight, and more preferably from 0.1 to 5% by weight. When the ink for inkjet includes the defoamer in an amount of from 0.1 to 5% by weight, almost no foam is generated.

Any pH adjusters that can adjust pH of prescribed ink to be from 7 to 11 without having an adverse impact on the ink can be used. Specific examples thereof include, but are not limited to, alcohol amines, alkali metal hydroxides, ammonium hydroxides, phosphonium hydoxides, and alkali metal carbonates. When the ink has a pH of from 7 to 11, there is almost no problem of liquid contactability of the head and ink feed unit.

Specific examples of the alcohol amines include, but are not limited to, diethanol amine, triethanol amine, and 2-amino-2-ethyl-1,3-propane diol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide, quaternary ammonium hydroxide, and quaternary phosphonium hydroxide.

Specific examples of the alkali metal carbonates include, but are not limited to, lithium carbonate, sodium carbonate, and potassium carbonate.

Specific examples of the anti-septic and anti-fungal agents include, but are not limited, dehydrosodium acetate, sodium sorbinate, 2-pyridine thiol-1-oxide sodium, sodium benzoate, and pentachlorophenol sodium.

Specific examples of the chelate reagents include, but are not limited to, ethylene diamine sodium tetraacetate, nitrilo sodium triacetate, hydroxyethylethylene diamine sodium triacetate, diethylene triamine sodium quinternary acetate, and uramil sodium diacetate.

Specific examples of the antirust agents include, but are not limited to, acid sulfite, thiosodium sulfate, ammonium thiodiglycolate, diisopropyl ammonium nitride, pentaerythritol quaternary nitdride, and dicyclohexyl ammonium nitride.

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Specific examples of the phenol-based anti-oxidants (including hindered phenol-based anti-oxidants) include, but are not limited to, butylated hydroxy anisol, 2,6-di-tert-butyl-4-ethylphenol, and stearyl-β13-(3,5-di-tert-butyl-4-hydroxyphenyl)propionate.

Specific examples of the amine-based anti-oxidants include, but are not limited to, phenyl-β-naphthylamine, α-naphthyl amine, and N,N'-di-sec-butyl-p-phenylene diamine.

Specific examples of the sulfur-based anti-oxidants include, but are not limited to, dilauryl-3,3'-thio dipropionate, distearyl thiodipropionate, and laurylstearyl thiodipropionate.

Specific examples of phosphorous-based anti-oxidants include, but are not limited to, triphenylphosphite, octadecylphosphite, and triisodecylphosphite.

Specific examples of the ultraviolet absorbers include, but are not limited to, benzophenone-based ultraviolet absorbents, benzotriazole-based ultraviolet absorbents, salicylate-based ultraviolet absorbents, cyanoacrylate-based ultraviolet absorbents, and nickel complex salt-based ultraviolet absorbents.

Specific examples of the benzophenone-based ultraviolet absorbers include, but are not limited to, 2-hydroxy-4-n-octoxybenzophenone, 2-hydroxy-4-n-dodecyloxy benzophenone, and 2,4-dihydroxy benzophenone.

Specific examples of the benzotriazole-based ultraviolet absorbers include, but are not limited to, 2-(2'-hydroxy-5'-tert-octylphenyl)benzo triazole, 2-(2'-hydroxy-5'-methylphenyl)benzo triazole, and 2-(2'-hydroxy-4'-octoxyphenyl) benzo triazole.

Specific examples of the salicylate-based ultraviolet absorbers include, but are not limited to, phenyl salicylate, p-tert-butylphenyl salicylate, and p-octylphenyl salicylate.

Specific examples of the cyanoacrylate-based ultraviolet absorbers include, but are not limited to, ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Specific examples of the nickel complex salt-based ultraviolet absorbers include, but are not limited to, nickel-bis (octylphenyl)sulfide, 2,2'-thiobis(4-tert-octyl ferrate)-n-butylamine nickel (II), and 2,2'-thiobis(4-tert-octyl ferrate)-2-ethylhexyl amine nickel (II).

—Method of Preparing Ink for Inkjet—

The ink for use in the present invention is prepared by dispersing or dissolving a hydrodispersible colorant, a hydrosoluble moisturizer, hydrodispersible resin, a surfactant, a penetrant and water with optional components in an aqueous medium for use followed by stirring and mixing, if desired. Dispersion is conducted by a sand mill, a homogenizer, a ball mill, a paint shaker, an ultrasonic dispersing agent, etc. Stirring and mixing can be conducted by a stirrer having a stirring wing, a magnetic stirrer, a high-speed disperser, etc.

—Properties of Ink for Inkjet—

There is no specific limit to the properties of the ink for inkjet recording and any suitable ink can be selected. For example, the viscosity and the surface tension with the following ranges are preferable.

The ink preferably has a viscosity of from 5 to 25 mPa·s, and more preferably from 6 to 20 mPa·s at 25° C.

When the ink viscosity is 5 mPa·s or greater, the printing density and the printing quality are improved. When the ink viscosity is 25 mPa·s or less, a suitable ink discharging property is secured.

The viscosity can be measured by a viscometer (RE-550L, from TOKI SANGYO CO., LTD.) at 25° C.

The ink preferably has a surface tension not greater than 35 mN/m, and more preferably not greater than 32 mN/m at 25° C. When 35 mN/m or less, leveling of the recording media improves.

The ink can be used in any printers such as a piezoelectric element type in which ink droplets are discharged by transforming a vibration plate forming the wall of the ink flowing route using a piezoelectric element as a pressure generating device to press the ink in the ink flowing route as described in JP-H2-51734-A; a thermal type in which bubbles are produced by heating ink in the ink flowing route with a heat element as described in JP-S61-59911-A; and an electrostatic type in which ink droplets are discharged by transforming a vibration plate by a force of electrostatic generated between the vibration plate and the electrode while the vibration plate and the electrode are provided facing each other as described in JP-H6-71882-A The ink of the present invention is preferably used in various fields such as inkjet recording, fountain pens, ball-point pens, felt-tip pens and fiber-tip pens. Particularly, the ink is preferably used in image forming apparatuses such as printers using inkjet recording methods. The ink can be used in a printer heating recording media and the ink at from 50 to 200° C. when or before and after printing to promote fixing images. Further, the ink is preferably used for the ink media set, the ink cartridge, the inkjet recording method, the inkjet recorder, and the ink recorded matter of the present invention.

Various recording media such as plain papers, glossy papers, special papers, clothes, films OHP sheets and general print papers can be used. These can be used alone or in combination.

The ink recorded matter has high quality images without bleeding, good temporal stability, and can be used in various applications such as recorded letters and images.

However, general print papers having a specific liquid absorbing property need to be used to form images having good image quality such as image density, color saturation, beading and color bleed, high glossiness and good fixability. Specifically, a recording medium pure water preferably transfers to in an amount of from 1 to 10 mL/m² at a contact time of 100 ms when measured by a dynamic scanning absorptometer is used. The recording medium pure water transfers to in an amount of from 1 to 10 mL/m² prevents beading (adjacent dots draw each other to form blistering images) and color bleed.

The dynamic scanning absorptometer can precisely measure a liquid absorption for quite a short time. The apparatus (i) directly reads liquid absorption velocity from movement of meniscus in a capillary, (ii) forms a sample into a disc and spirally scans a liquid absorption head thereon. The scanning speed is automatically changed according to a predetermined pattern to measure only the points needed, i.e., the measurement is automated. A liquid feed head to a paper sample is connected to the capillary through a TEFLON® tube, and the meniscus position in the capillary is automatically read by an optical sensor. Specifically, a dynamic scanning absorptometer (K350 series D from Kyowa Co., Ltd.) is used to measure transfer amount of pure water. The transfer amount at a contact time of 100 ms can be measured by interpolating a measured value of a transfer amount at a neighboring contact time of each contact time.

Marketed products of print papers having the specific liquid absorbing property include Ricoh Business Coat Gloss 100 from Ricoh Company, Ltd; OK Top Coat+, OK Kinfuji+ and SA Kinfuji+ from Oji Paper Co., Ltd.; LUMIART which is gloss coat paper having a weight of 90 g/m² from STORA ENSO; Super MI Dull, Aurora Coat and Space DX from Nippon Paper Industries, Co., Ltd.; α Mat and μ Coat from Hokuetsu paper Mills, Ltd.; Raicho Art and Raicho Super Art from Chuetsu Pulp & Paper Co., Ltd.; Pearl Coat from Mitsubishi Paper Mills Ltd., etc.

In addition, the print paper having the specific liquid absorbing property preferably has a coated layer at least on one surface thereof <Ink Cartridge>

The ink cartridge of this disclosure includes a container in which the ink of this disclosure is contained, and optionally includes other members.

The container is not particularly limited, and the shape, structure, dimension and constitutional materials of the container are properly determined depending on the purpose of the ink cartridge. For example, ink bags made of an aluminum-laminated film, or a resin film can be preferably used.

Figure 2:
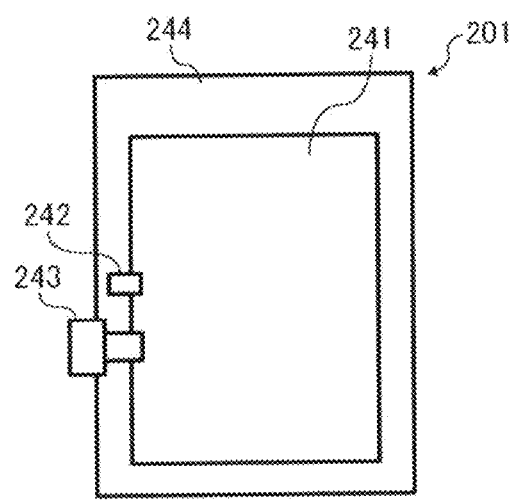
FIG. 2 is a schematic view illustrating the ink cartridge including the ink bag in a cartridge case.

The ink cartridge will be described by reference to FIGS. 1 and 2. FIG. 1 is a schematic view illustrating an ink cartridge according to an embodiment, and FIG. 2 is a schematic view illustrating a modified version of the ink cartridge illustrated in FIG. 1.

As illustrated in FIG. 1, the ink of this disclosure is fed into an ink bag 241 (serving as a container) of an ink cartridge 201 from an ink inlet 242. After discharging air from the ink bag 241, the ink inlet 242 is closed by welding or the like. When the ink cartridge 201 is used, the ink cartridge 201 is set in an inkjet printer 101 (illustrated in FIG. 3) so that a needle of the inkjet printer is inserted into an ink outlet 243 of the ink cartridge 201, and therefore the ink in the ink bag 241 is supplied to a main body of the printer 101.

The ink bag 241 is typically made of a material having low permeability to gas such as wrapping materials (e.g., aluminum-laminated films).

The ink bag 241 is contained in a cartridge case 244 (illustrated in FIG. 2) typically made of a plastic.

The resultant ink cartridge 201 is typically used by being detachably attached to an image forming apparatus, preferably the inkjet recording apparatus of this disclosure mentioned later.

<Image Forming Methods>

When an image is formed using the ink of this disclosure, an ink ejecting process is performed in which stimulus (energy) is applied to the ink in an inkjet recording head so that the ink is ejected from the recording head toward a recoding medium to form the image on the recording medium. In this regard, in order to form images having a high image density without image blurring, and soiling of the backside of the recording medium, a pretreatment liquid applying process in which a pretreatment liquid is applied to the recording medium before the ink ejecting process, and/or an aftertreatment liquid applying process in which a aftertreatment liquid is applied to the recording medium after the ink ejecting process can be performed.

—Ink Ejecting Process and Ink Ejecting Device—

In the ink ejecting process, stimulus (energy) is applied to the ink to eject the ink, so that the ejected ink flies and is adhered to a surface of a recording medium, thereby forming an ink image on the recording medium.

The ink ejecting device (i.e., inkjet recording head) applies stimulus (energy) to the ink to eject the ink toward a recording medium, thereby forming an ink image on the recording medium. The ink ejecting device is not particularly limited, and for example, inkjet nozzles can be used as the ink ejecting device.

In the ink ejecting device of the inkjet recording apparatus of this disclosure, at least part of the liquid chamber, the fluid resistant portion, the vibrating plate and the nozzles is preferably made of a material including at least one of silicon or nickel.

In addition, the nozzles preferably have a diameter of not greater than 30 μm, and more preferably from 1 μm to 20 μm.

The above-mentioned stimulus (energy) is generated by a stimulus generator. The stimulus is not particularly limited, and is determined depending on the purpose of the ink ejecting device. For example, heat (temperature), pressure, vibration and light can be used as the stimulus. These can be used alone or in combination. Among these, heat and pressure are preferable.

Suitable devices for use as the stimulus generator include heaters, pressing devices, piezoelectric devices, vibration generators, ultrasonic oscillators, and lights. Specific examples thereof include, but are not limited thereto, piezoelectric actuators (e.g., piezoelectric devices), thermal actuators to eject ink droplets utilizing phase change of ink by boiling a liquid film using an electrothermal device such as a resistor, shape memory alloy actuators utilizing phase change of metal caused by temperature change, and electrostatic actuators utilizing electrostatic force.

The manner of ink ejection is not particularly limited, and changes depending on the stimulus applied. For example, when the stimulus is heat, a method in which heat energy is applied to the ink in an inkjet recording head according to image information signals using a thermal head or the like to form a bubble in the ink, thereby ejecting the ink in the recording head from a nozzle by the pressure of the bubble can be used. When the stimulus is pressure, a method in which a voltage is applied to a piezoelectric element adhered to a pressure chamber present in an ink flow path in an inkjet recording head to bend the piezoelectric element, thereby decreasing the volume of the pressure chamber, resulting in ejection of the inkjet ink from a nozzle of the recording head can be used.

The volume of an inkjet ink droplet ejected from a nozzle is generally from $3 \times 10^{-15}$ to $40 \times 10^{-15}$ m$^3$ (i.e., 3 to 40 pl). The speed of an ejected ink droplet is generally from 5 to 20 m/s. The drive frequency is generally not less than 1 kHz. The resolution of images recorded by ejected ink droplets is generally not less than 300 dpi (dots per inch).

The above-mentioned stimulus generators are controlled by a controller. The controller is not particularly limited, and for example, a device such as sequencers and computers is used.

Figure 3:
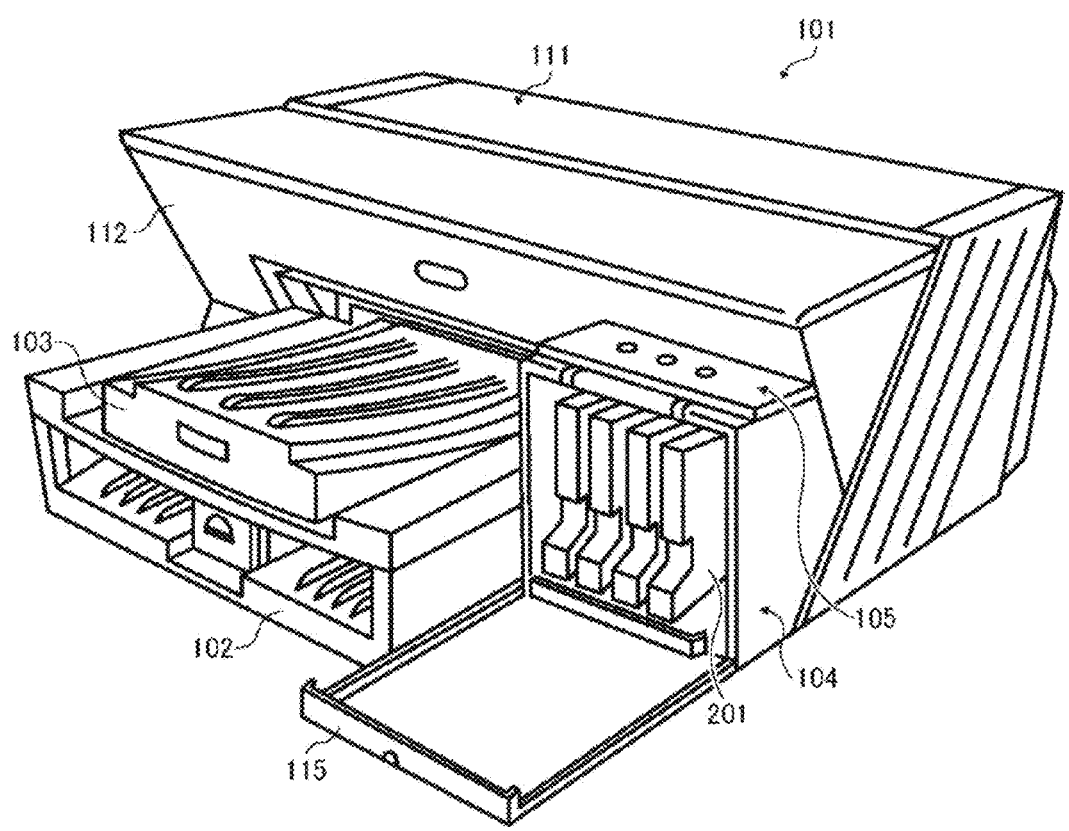
FIG. 3 is a perspective view illustrating an embodiment of the inkjet recorder of the present invention with a cover of the ink cartridge loading part open.

Next, the inkjet recording apparatus of this disclosure will be described by reference to a serial inkjet recording apparatus. FIG. 3 is a schematic perspective view illustrating a serial inkjet recording apparatus as an inkjet recording apparatus according to an embodiment. The inkjet recording apparatus illustrated in FIG. 3 includes a main body 101 thereof, a recording sheet feed tray 102, which is attached to the main body 101 and on which a stack of recording sheets is set, a copy tray 103, which is attached to the main body 101 and on which recording sheets bearing ink images thereon are stacked, and an ink cartridge setting portion 104 to which ink cartridges 201 are detachably attached. On the upper surface of the ink cartridge setting portion 104, an operating portion 105 including operation keys, a display, etc. is arranged. The ink cartridge setting portion 104 has a front cover 115 which is openable and closable so that the ink cartridges 201 can be attached to the ink cartridge setting portion 104 or detached therefrom. Numerals 111 and 112 respectively denote an upper cover of the inkjet recording apparatus, and a front cover of the apparatus.

Figure 4:
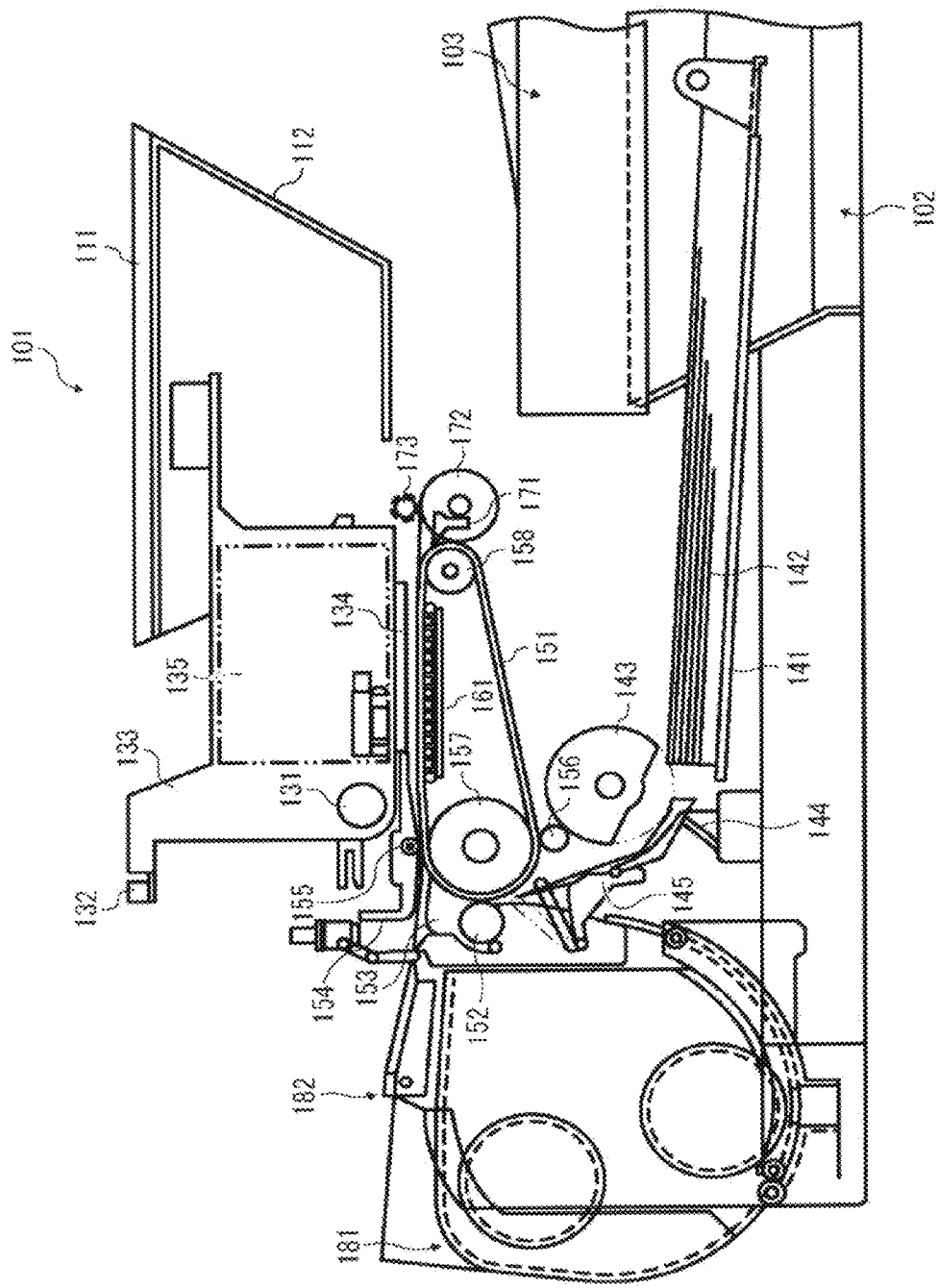
FIG. 4 is a schematic view illustrating an overall structure of the inkjet recorder.
Figure 5:
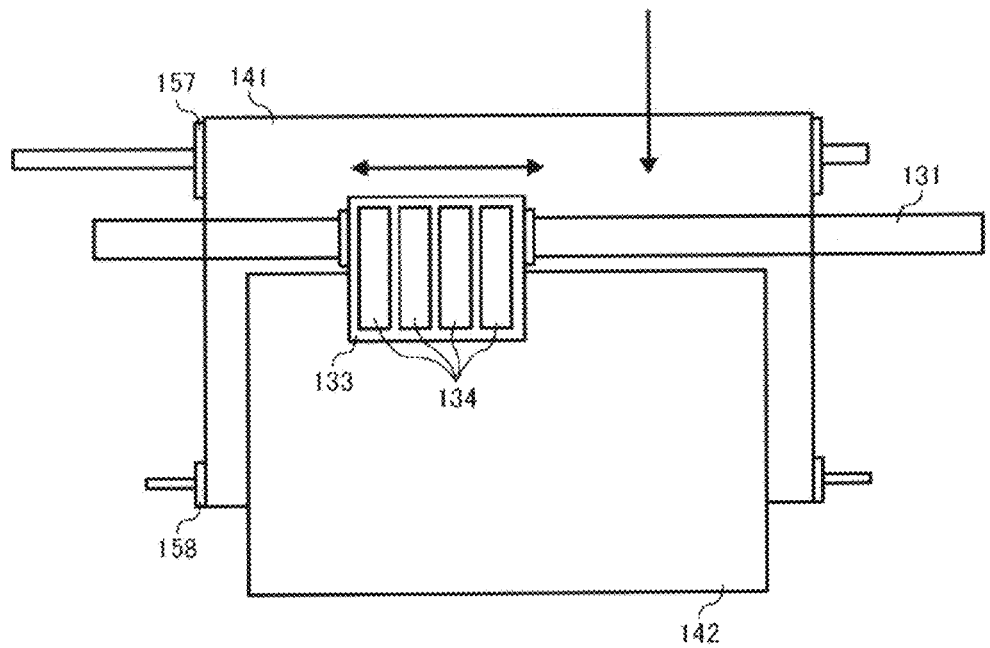
FIG. 5 is an enlarged view illustrating an example of an inkjet head of the inkjet recorder.

As illustrated in FIGS. 4 and 5, a carriage 133 is slidably supported by a guide rod 131 and a stay 132, which are supported by both side plates (not shown) of the main body 101, so that the carriage 133 is moved in a main scanning direction (A) by a main scanning motor (not shown) to perform a scanning operation (i.e., an image forming operation).

An inkjet recording head 134 including four inkjet recording heads, each of which has multiple nozzles arranged in a direction perpendicular to the main scanning direction (A) to eject droplets of yellow (Y), magenta (M), cyan (C) or black (K) inkjet ink downward, is provided on the carriage 133.

Each of the four inkjet recording heads 134 includes an energy generator to eject ink droplets. Specific examples of the energy generator include, but are not limited thereto, piezoelectric actuators (e.g., piezoelectric devices), thermal actuators to eject ink droplets utilizing phase change of ink by boiling a liquid film using an electrothermal device such as a resistor, shape memory alloy actuators utilizing phase change of metal caused by temperature change, and electrostatic actuators utilizing electrostatic force.

In addition, sub-tanks 135 containing the color inkjet inks to supply the color inkjet inks to the respective recording heads 134 are provided on the carriage 133. The color inkjet inks in the ink cartridges 201 set to the ink cartridge setting portion 104 are supplied to the respective sub-tanks 135 via respective ink supplying tubes (not shown).

The inkjet recording apparatus includes a recording sheet supplier to feed recording sheets 142 set on a sheet loading portion (pressing plate) 141. The recording sheet supplier includes a sheet feeding roller 143 to feed the recording sheets 142, and a separation pad 144, which faces the sheet feeding roller 143 while being biased toward the sheet feeding roller 143 and which is made of a material having a high friction coefficient, to feed the recording sheets 142 one by one from the sheet loading portion 141.

The inkjet recording apparatus further includes a feeder to feed the recording sheet 142, which is fed from the recording sheet supplier, toward the image recording area located below the inkjet recording head 134. The feeder includes a feeding belt 151 to feed the recording sheet 142 while electrostatically attracting the recording sheet, a counter roller 152 to feed the recording sheet 142, which is fed from the recording sheet supplier along a guide 145, while sandwiching the recording sheet 142 with the feeding belt 151, a direction changing guide 153 to change the direction of the recording sheet 142, which is fed substantially vertically, at an angle of about 90° so that the recording sheet 142 is contacted with the feeding belt 151 so as to be fed thereby, a pressing roller 155 which is biased toward the feeding belt 151 by a pressing member 154, and a charging roller 156 to charge the surface of the feeding belt 151.

The feeding belt 151 is an endless belt, which is tightly stretched by a feeding roller 157 and a tension roller 158 so as to be rotated in a recording sheet feeding direction (i.e., a sub-scanning direction (B)) perpendicular to the main scanning direction (A). For example, the feeding belt 151 includes a first layer (i.e., an uppermost layer), which electrostatically attracts the recording sheet 142 and which is made of a resin layer (such as a tetrafluoroethylene—ethylene copolymer (ETFE) whose electric resistance is not controlled) with a thickness of about 40 μm, and a second layer (i.e., a medium resistance layer or a grounding layer), which is made of almost the same material as that of the first layer except that carbon black is included therein so that the second layer has a medium electric resistance. In addition, a guide member 161 is arranged below the feeding belt 151 so as to face the image recording area in which an image is recorded on the recording sheet 142 by the inkjet recording head 134. The inkjet recording apparatus further includes a sheet discharger to discharge the recording sheet 142, which bears an image recorded by the inkjet recording head 134, from the main body 101. The sheet discharger includes a separation pick 171 to separate the recording sheet 142 from the feeding belt 151, and discharging rollers 172 and 173 to discharge the recording sheet 142 toward the copy tray 103 located below the discharging roller 172.

A duplex copy unit 181 is detachably attached to the backside of the main body 101 of the inkjet recording apparatus. The duplex copy unit 181 receives the recording sheet 142, which is fed to the duplex copy unit 181 by reversely rotating the feeding belt 151, and feeds again the recording sheet 142 to the nip between the counter roller 152 and the feeding belt 151 so that another image is formed on the backside of the recording sheet 142 by the inkjet recording heads 134 in the image recording area. A manual sheet feeder 182, by which a recording sheet can be manually fed to the inkjet recording apparatus, is provided above the duplex copy unit 181.

The recording sheet 142 is supplied one by one by the recording material supplier. The recording sheet 142 thus fed in substantially the vertical direction is guided by the guide 145 to the nip between the feeding belt 151 and the counter roller 152 so as to be fed by the feeding belt 151 and the counter roller 152. Further, the recording sheet 142 is guided by the direction changing guide 153 so that the direction of the sheet is changed at an angle of about 90°.

The recording sheet 142 is then fed by the feeding belt 151 while pressed toward the feeding belt 151 by the pressing roller 155. In this regard, since the feeding belt 151 is charged by the charging roller 156, the recording sheet 142 is fed by the feeding belt 151 while electrostatically adhered thereto. Next, the carriage 133 is moved in the main scanning direction (A) while the inkjet recording head 134 is driven according to image signals so as to eject droplets of the color inkjet inks to form one line image on the surface of the recording sheet 142, which is stopped in the image forming operation. After recording one line image, the recording sheet 142 is fed in a predetermined length in the sub-scanning direction (B), and the next image forming operation is performed to form another one line image on the surface of the recording material sheet 142. By repeating the image forming operation, an image is formed on the surface of the recording material sheet 142. When the inkjet recording apparatus receives a signal such that the image recording operation is completed or the rear edge of the recording sheet 142 reaches the image recording area, the inkjet recording apparatus stops the image forming operation, and the sheet discharger discharges the recording sheet 142 bearing the image thereon to the copy tray 103.

When it is detected that the inkjet ink in the sub tank 135 is substantially exhausted (i.e., near-end of ink is detected), a predetermined amount of ink is supplied to the sub tank 135 from the corresponding ink cartridge 201.

When the inkjet ink in the ink cartridge 201 is exhausted, it is possible that after the ink cartridge is disassembled, the ink bag in the ink cartridge is replaced with a new ink bag, and then the ink cartridge 201 is assembled again to be attached to the inkjet recording apparatus. Even when the ink cartridge 201 is set so as to be vertical from a front side of the inkjet recording apparatus as illustrated in FIG. 3, the ink in the ink cartridge 201 can be stably supplied to the corresponding sub tank 135. Therefore, even when the ink cartridge cannot be set from the upper side of the main body 101 of the inkjet recording apparatus due to space limitation (for example, in a case where the apparatus is set in a rack or an object is set on the upper surface of the apparatus), the ink cartridge 201 can be easily replaced.

Hereinbefore, the inkjet recording apparatus of this disclosure has been described by reference to a serial (shuttle-type) inkjet recording apparatus in which a carriage is scanned in the main scanning direction (A). However, the inkjet recording apparatus is not limited thereto, and can include a line inkjet recording apparatus using a line-type inkjet recording head. The recording media include roll papers as well as cut papers. Particularly, a recording medium having very low permeation speed, pure water transfers to in an amount of from 1 to 15 mL/m² at a contact time of 100 ms when measured by a dynamic scanning absorptometer is preferably used.

(Ink Recorded Matter)

The ink of this disclosure can form a print in which an image of the ink is formed on a recording medium serving as a support. The recording medium is not particularly limited. Specific examples of the recording medium include papers such as plain papers, gloss papers, and general-purpose printing papers.

The print of this disclosure has high image quality, and good preservation stability. Therefore, the print can be used for various purposes such as archival documents.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

<Preparation of Ink for Inkjet Recording>

Each of pigment dispersions were prepared as follows.

Preparation Example 1

Preparation of Surface-Modified Black Pigment Dispersion 1

One hundred (100) g of carbon black Black Pearls (trademark) 1000 from Cabot Corporation having a BET surface area of 343 m²/g and 105 mL/100 g of DBPA, 100 mmol of the compound having the formula (I), and 1 L of ion-exchanged high purity water were mixed by Silverson mixer at room temperature and 6,000 rpm to prepare a mixture. When the resultant slurry has a pH higher than 4, 100 mmol of nitric are added thereto. Thirty (30) min later, 100 mmol of sodium nitrite dissolved in a small amount of ion-exchanged high purity water were slowly added to the mixture. Further, the mixture was heated to have a temperature of 60° C. while stirred for 1 hr to form a modified pigment which is carbon black added with the compound having the formula (I). The pH of the mixture was adjusted to be 10 with a NaOH solution to obtain a modified pigment dispersion 30 min later. A dispersion including a pigment combined with at least a geminal bisphosphonic acid group or a geminal bisphosphonic acid salt group and ion-exchanged high purity water were ultrafiltrated with a dialysis membrane, and was further subjected to ultrasonic dispersion to obtain a modified pigment dispersion in which a solid content is condensed to 20%. The surface treatment level was 0.75 mmol/g and the volume-average particle diameter ($D_{50}$) was 120 nm when measured by a particle diameter distribution measurer Nanotrac UPA-EX150 from Nikkiso Co., Ltd. Further, the content of sodium ions was 27,868 ppm when measured by a TOA-DKK ion meter IM-32P, and the quantity of phosphorus was 2.31% when subjected to element analysis measurement.

Preparation Example 2

Preparation of Surface-Modified Magenta Pigment Dispersion 1

One hundred (100) g of Pigment Ref 122 from Sun Chemical Co., Ltd, 50 mmol of the compound having the formula (II), and 1 L of ion-exchanged high purity water were mixed by Silverson mixer at room temperature and 6,000 rpm to prepare a mixture. Thirty (30) min later, 100 mmol of sodium nitrite dissolved in a small amount of ion-exchanged high purity water were slowly added to the mixture. Further, the mixture was heated to have a temperature of 60° C. while stirred for 1 hr to form a modified pigment which is Pigment Red 122 added with the compound having the formula (II). The pH of the mixture was adjusted to be 10 with a tetramethylammonium hydroxide solution to obtain a modified pigment dispersion 30 min later. A dispersion including a pigment combined with at least a geminal bisphosphonic acid group or a geminal bisphosphonic acid salt group and ion-exchanged high purity water were ultrafiltrated with a dialysis membrane, and was further subjected to ultrasonic dispersion to obtain a modified pigment dispersion in which a solid content is condensed to 20%. The surface treatment level was 0.50 mmol/g and the volume-average particle diameter ($D_{50}$) was 111 nm when measured by a particle diameter distribution measurer Nanotrac UPA-EX150 from Nikkiso Co., Ltd. Further, the quantity of phosphorus was 0.26% when subjected to element analysis measurement.

Preparation Example 3

Preparation of Surface-Modified Cyan Pigment Dispersion 1

Six hundred ninety (690) g of SMART Cyan 3154BA (Pigment Blue 15:4 surface-treated dispersion including solid content of 14.5%) from Sensient Technologies Corp., 50 mmol of the compound having the formula (I), and 500 mL of ion-exchanged high purity water were mixed by Silverson mixer at room temperature and 6,000 rpm to prepare a mixture. Thirty (30) min later, 100 mmol of sodium nitrite dissolved in a small amount of ion-exchanged high purity water were slowly added to the mixture. Further, the mixture was heated to have a temperature of 60° C. while stirred for 1 hr to form a modified pigment which is Pigment Blue 15:4 added with the compound having the formula (I). The pH of the mixture was adjusted to be 10 with a tetramethylammonium hydroxide solution to obtain a modified pigment dispersion 30 min later. A dispersion including a pigment combined with at least a geminal bisphosphonic acid group or a geminal bisphosphonic acid salt group and ion-exchanged high purity water were ultrafiltrated with a dialysis membrane, and was further subjected to ultrasonic dispersion to obtain a modified pigment dispersion in which a solid content is condensed to 20%. The surface treatment level was 0.50 mmol/g and the volume-average particle diameter ($D_{50}$) was 113 nm when measured by a particle diameter distribution measurer Nanotrac UPA-EX150 from Nikkiso Co., Ltd. Further, the quantity of phosphorus was 0.27% when subjected to element analysis measurement.

Preparation Example 4

Preparation of Surface-Modified Cyan Pigment Dispersion 1

Six hundred ninety (690) g of SMART Yellow 3074BA (Pigment Yellow 74 surface-treated dispersion including solid content of 14.5%) from Sensient Technologies Corp., 50 mmol of the compound having the formula (II), and 500 mL of ion-exchanged high purity water were mixed by Silverson mixer at room temperature and 6,000 rpm to prepare a mixture. Thirty (30) min later, 100 mmol of sodium nitrite dissolved in a small amount of ion-exchanged high purity water were slowly added to the mixture. Further, the mixture was heated to have a temperature of 60° C. while stirred for 1 hr to form a modified pigment which is Pigment Yellow 74 added with the compound having the formula (II). The pH of the mixture was adjusted to be 10 with a tetramethylammonium hydroxide solution to obtain a modified pigment dispersion 30 min later. A dispersion including a pigment combined with at least a geminal bisphosphonic acid group or a geminal bisphosphonic acid salt group and ion-exchanged high purity water were ultrafiltrated with a dialysis membrane, and was further subjected to ultrasonic dispersion to obtain a modified pigment dispersion in which a solid content is condensed to 20%. The surface treatment level was 0.50 mmol/g and the volume-average particle diameter ($D_{50}$) was 142 nm when measured by a particle diameter distribution measurer Nanotrac UPA-EX150 from Nikkiso Co., Ltd. Further, the quantity of phosphorus was 0.2% when subjected to element analysis measurement.

Preparation Example 5

Preparation of Polymer Particulate Dispersion Including Magenta Pigment

—Preparation of Polymer Solution A—

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer (Product name: AS-6, manufactured by TOAGOSEI CO., LTD.), and 0.4 g of mercapto ethanol were placed therein and thereafter, the system was heated to 65° C. Next, a liquid mixture of 100.8 g of styrene, 25.2 g of acrylic acid, 108.0 g of lauryl methacylate, 36.0 g of polyethylene glycol methacrylate, 60.0 g of hydroxyethyl methacrylate, 36.0 g of polyethylene glycol methacrylate, 4.0 g of styrene macromer (Product name: AS-6, manufactured by TOAGOSEI CO., LTD.), 3.6 g of mercapto ethanol, 2.4 g of azobis dimethyl valeronitrile, and 18 g of methyl ethyl ketone was dripped to the flask in 2.5 hours. Subsequently, a liquid mixture of 0.8 g of azobis dimethyl valeronitrile and 18 g of methyl ethyl ketone was dripped to the flask in 0.5 hours. After aging at 65° C. for one hour, 0.8 g of azobis dimethyl valeronitrile was added followed by aging for another hour. After the reaction was complete, 364 g of methyl ethyl ketone was added into the flask to obtain 800 g of a polymer solution A having a concentration of 50% by weight.

—Preparation of Pigment-Containing Polymer Particulate Dispersion—

Twenty-eight (28) g of the polymer solution A, 42 g of C. I. Pigment Red 122, 13.6 g of an aqueous solution including potassium hydroxide in an amount of 1 mol/L, 20 g of methyl ethyl ketone, and 13.6 g of ion-exchanged water were fully stirred and kneaded in a roll mill. After the resultant paste was placed in 200 g of pure water and fully stirred, methyl ethyl ketone and water were removed by an evaporator. Further, the resultant dispersion was filtered with pressure through a polyvinylidene fluoride membrane filter having an average pore diameter of 5.0 μm to obtain a polymer particulate dispersion including magenta pigment having a pigment concentration of 15% by weight and a solid content concentration of 20% by weight. The volume-average particle diameter ($D_{50}$) of the polymer particulate dispersion including magenta pigment was 127 nm when measured by a particle diameter distribution measurer Nanotrac UPA-EX150 from Nikkiso Co., Ltd.

Preparation Example 6

Preparation of Polymer Particulate Dispersion Including Cyan Pigment

The procedure for preparation of the pigment-containing polymer particulate dispersion in Preparation Example 5 was repeated except for replacing C. I. Pigment Red 122 with a phthalocyanine pigment (C. I. Pigment Blue 15:3) to obtain a polymer particulate dispersion including cyan pigment. The volume-average particle diameter ($D_{50}$) thereof was 93 nm when measured by a particle diameter distribution measurer Nanotrac UPA-EX150 from Nikkiso Co., Ltd.

Preparation Example 7

Preparation of Polymer Particulate Dispersion Including Yellow Pigment

The procedure for preparation of the pigment-containing polymer particulate dispersion in Preparation Example 5 was repeated except for replacing C. I. Pigment Red 122 with a monoazo yellow pigment (C. I. Pigment Yellow 74) to obtain a polymer particulate dispersion including yellow pigment. The volume-average particle diameter ($D_{50}$) thereof was 76 nm when measured by a particle diameter distribution measurer Nanotrac UPA-EX150 from Nikkiso Co., Ltd.

Preparation Example 8

Preparation of Polymer Particulate Dispersion Including Carbon Black Pigment

The procedure for preparation of the pigment-containing polymer particulate dispersion in Preparation Example 5 was repeated except for replacing C. I. Pigment Red 122 with carbon black (FW100 from Evonik Degussa GmbH) to obtain a polymer particulate dispersion including carbon black pigment. The volume-average particle diameter ($D_{50}$) thereof was 104 nm when measured by a particle diameter distribution measurer Nanotrac UPA-EX150 from Nikkiso Co., Ltd.

Examples 1 to 33 and Comparative Examples 1 to 28

Preparation of Ink for Inkjet

Ink compositions having the following formulations were prepared, and adjusted by 10% by weight aqueous solution of lithium hydroxide in such a manner that pH was 9. These were then filtered with a membrane filter having a pore size of 0.8 μm to obtain inks.

TABLE 1

| | | 1 | | | | |
|---|---|---|---|---|---|---|
| | | Ex. 1 | Ex. 2 | Ex. 3 | Ex. 4 | Ex. 5 |
| Pigment Dispersion | Preparation Example 1 (Black) | | | | | |
| | Preparation Example 2 (Magenta) | | | | | |
| | Preparation Example 3 (Cyan) | 5 | 5 | 5 | 5 | 5 |
| | Preparation Example 4 (Yellow) | | | | | |
| | Preparation Example 5 (Magenta) | | | | | |
| | Preparation Example 6 (Cyan) | | | | | |
| | Preparation Example 7 (Yellow) | | | | | |
| | Preparation Example 8 (Black) | | | | | |
| | SENSIJET SMART Magenta 3122BA | | | | | |
| | SENSIJET SMART Cyan 3154BA | | | | | |
| | SENSIJET SMART Yellow 3074BA | | | | | |
| | SENSIJET Black SDP2000 | | | | | |
| | Black CAB-O-JET 300 | | | | | |
| | Cyan CAB-O-JET 250 | | | | | |
| | Magenta CAB-O-JET 260 | | | | | |

TABLE 1-continued

|  |  |  |  |  |  |  |
|---|---|---|---|---|---|---|
|  | Yellow CAB-O-JET 270 |  |  |  |  |  |
| Resin Dispersion | Acrylic-silicone resin emulsion | 2 | 2 | 2 | 2 | 2 |
|  | Polyurethane resin emulsion |  |  |  |  |  |
| Moisturizer | 3-methoxy-1-butanol | 8 | 10 | 15 | 40 | 59 |
|  | 3-methoxy-1-methyl butanol |  |  |  |  |  |
|  | 1,2-butane diol | 41 | 39 | 34 | 9 |  |
| Surfactant | ECTD-3NEX |  |  |  |  |  |
|  | DSN403N | 0.06 | 0.06 | 0.06 | 0.06 | 0.06 |
|  | EP-7025 |  |  |  |  |  |
| Pure Water |  | Balance | Balance | Balance | Balance | Balance |
| Total |  | 100 | 100 | 100 | 100 | 100 |
| Total Amount of Hydrosoluble Organic Material |  | 49.06 | 49.06 | 49.06 | 49.06 | 59.06 |

2

|  |  | Com. Ex. 1 | Com. Ex. 2 | Ex. 6 | Ex. 74 | Com Ex. 3 |
|---|---|---|---|---|---|---|
| Pigment Dispersion | Preparation Example 1 (Black) |  |  |  |  |  |
|  | Preparation Example 2 (Magenta) |  |  |  |  |  |
|  | Preparation Example 3 (Cyan) | 5 | 5 | 5 | 5 | 5 |
|  | Preparation Example 4 (Yellow) |  |  |  |  |  |
|  | Preparation Example 5 (Magenta) |  |  |  |  |  |
|  | Preparation Example 6 (Cyan) |  |  |  |  |  |
|  | Preparation Example 7 (Yellow) |  |  |  |  |  |
|  | Preparation Example 8 (Black) |  |  |  |  |  |
|  | SENSIJET SMART Magenta 3122BA |  |  |  |  |  |
|  | SENSIJET SMART Cyan 3154BA |  |  |  |  |  |
|  | SENSIJET SMART Yellow 3074BA |  |  |  |  |  |
|  | SENSIJET Black SDP2000 |  |  |  |  |  |
|  | Black CAB-O-JET 300 |  |  |  |  |  |
|  | Cyan CAB-O-JET 250 |  |  |  |  |  |
|  | Magenta CAB-O-JET 260 |  |  |  |  |  |
|  | Yellow CAB-O-JET 270 |  |  |  |  |  |
| Resin Dispersion | Acrylic-silicone resin emulsion | 2 | 2 | 2 | 2 | 2 |
|  | Polyurethane resin emulsion |  |  |  |  |  |
| Moisturizer | 3-methoxy-1-butanol | 65 | 25 | 25 | 25 | 25 |
|  | 3-methoxy-1-methyl butanol |  |  |  |  |  |
|  | 1,2-butane diol |  | 8 | 10 | 34 | 38 |
| Surfactant | ECTD-3NEX |  |  |  |  |  |
|  | DSN403N | 0.06 | 0.06 | 0.06 | 0.06 | 0.06 |
|  | EP-7025 |  |  |  |  |  |
| Pure Water |  | Balance | Balance | Balance | Balance | Balance |
| Total |  | 100 | 100 | 100 | 100 | 100 |
| Total Amount of Hydrosoluble Organic Material |  | 65.06 | 33.06 | 35.06 | 59.06 | 63.06 |

TABLE 1-continued

| | | 3 | | | | |
|---|---|---|---|---|---|---|
| | | Ex. 8 | Ex. 9 | Ex. 10 | Ex. 11 | Ex. 12 |
| Pigment Dispersion | Preparation Example 1 (Black) | | | | | |
| | Preparation Example 2 (Magenta) | 5 | 5 | 5 | 5 | 5 |
| | Preparation Example 3 (Cyan) | | | | | |
| | Preparation Example 4 (Yellow) | | | | | |
| | Preparation Example 5 (Magenta) | | | | | |
| | Preparation Example 6 (Cyan) | | | | | |
| | Preparation Example 7 (Yellow) | | | | | |
| | Preparation Example 8 (Black) | | | | | |
| | SENSIJET SMART Magenta 3122BA | | | | | |
| | SENSIJET SMART Cyan 3154BA | | | | | |
| | SENSIJET SMART Yellow 3074BA | | | | | |
| | SENSIJET Black SDP2000 | | | | | |
| | Black CAB-O-JET 300 | | | | | |
| | Cyan CAB-O-JET 250 | | | | | |
| | Magenta CAB-O-JET 260 | | | | | |
| | Yellow CAB-O-JET 270 | | | | | |
| Resin Dispersion | Acrylic-silicone resin emulsion | 2 | 2 | 2 | 2 | 2 |
| | Polyurethane resin emulsion | | | | | |
| Moisturizer | 3-methoxy-1-butanol | 8 | 10 | 15 | 40 | 59 |
| | 3-methoxy-1-methyl butanol | | | | | |
| | 1,2-butane diol | 41 | 39 | 34 | 9 | |
| Surfactant | ECTD-3NEX | | | | | |
| | DSN403N | 0.06 | 0.06 | 0.06 | 0.06 | 0.06 |
| | EP-7025 | | | | | |
| Pure Water | | Balance | Balance | Balance | Balance | Balance |
| Total | | 100 | 100 | 100 | 100 | 100 |
| Total Amount of Hydrosoluble Organic Material | | 49.06 | 49.06 | 49.06 | 59.06 | 65.06 |

| | | 4 | | | | |
|---|---|---|---|---|---|---|
| | | Com. Ex. 4 | Com. Ex. 5 | Ex. 13 | Ex.14 | Com. Ex. 6 |
| Pigment Dispersion | Preparation Example 1 (Black) | | | | | |
| | Preparation Example 2 (Magenta) | 5 | 5 | 5 | 5 | 5 |
| | Preparation Example 3 (Cyan) | | | | | |
| | Preparation Example 4 (Yellow) | | | | | |
| | Preparation Example 5 (Magenta) | | | | | |
| | Preparation Example 6 (Cyan) | | | | | |
| | Preparation Example 7 (Yellow) | | | | | |
| | Preparation Example 8 (Black) | | | | | |
| | SENSIJET SMART Magenta 3122BA | | | | | |
| | SENSIJET SMART Cyan 3154BA | | | | | |

TABLE 1-continued

|  |  |  |  |  |  |  |
|---|---|---|---|---|---|---|
| | SENSIJET SMART Yellow 3074BA | | | | | |
| | SENSIJET Black SDP2000 | | | | | |
| | Black CAB-O-JET 300 | | | | | |
| | Cyan CAB-O-JET 250 | | | | | |
| | Magenta CAB-O-JET 260 | | | | | |
| | Yellow CAB-O-JET 270 | | | | | |
| Resin Dispersion | Acrylic-silicone resin emulsion | 2 | 2 | 2 | 2 | 2 |
| | Polyurethane resin emulsion | | | | | |
| Moisturizer | 3-methoxy-1-butanol | 65 | 25 | 25 | 25 | 25 |
| | 3-methoxy-1-methyl butanol | | | | | |
| | 1,2-butane diol | | 8 | 10 | 34 | 38 |
| Surfactant | ECTD-3NEX | | | | | |
| | DSN403N | 0.06 | 0.06 | 0.06 | 0.06 | 0.06 |
| | EP-7025 | | | | | |
| Pure Water | | Balance | Balance | Balance | Balance | Balance |
| Total | | 100 | 100 | 100 | 100 | 100 |
| Total Amount of Hydrosoluble Organic Material | | 65.06 | 33.06 | 35.06 | 59.06 | 63.06 |

|  |  | 5 | | | | |
|---|---|---|---|---|---|---|
| | | Ex. 15 | Ex. 16 | Ex. 17 | Ex. 18 | Ex. 19 |
| Pigment Dispersion | Preparation Example 1 (Black) | | | | | |
| | Preparation Example 2 (Magenta) | | | 4 | 6 | |
| | Preparation Example 3 (Cyan) | 4 | 6 | | | 5 |
| | Preparation Example 4 (Yellow) | | | | | |
| | Preparation Example 5 (Magenta) | | | | | |
| | Preparation Example 6 (Cyan) | | | | | |
| | Preparation Example 7 (Yellow) | | | | | |
| | Preparation Example 8 (Black) | | | | | |
| | SENSIJET SMART Magenta 3122BA | | | | | |
| | SENSIJET SMART Cyan 3154BA | | | | | |
| | SENSIJET SMART Yellow 3074BA | | | | | |
| | SENSIJET Black SDP2000 | | | | | |
| | Black CAB-O-JET 300 | | | | | |
| | Cyan CAB-O-JET 250 | | | | | |
| | Magenta CAB-O-JET 260 | | | | | |
| | Yellow CAB-O-JET 270 | | | | | |
| Resin Dispersion | Acrylic-silicone resin emulsion | 2 | 2 | 2 | 2 | 2 |
| | Polyurethane resin emulsion | | | | | |
| Moisturizer | 3-methoxy-1-butanol | 25 | 25 | 25 | 25 | 25 |
| | 3-methoxy-1-methyl butanol | | | | | |
| | 1,2-butane diol | 34 | 20 | 34 | 19 | 3 |

TABLE 1-continued

| | | | | | | |
|---|---|---|---|---|---|---|
| Surfactant | ECTD-3NEX | | | | | |
| | DSN403N | 0.06 | 0.06 | 0.06 | 0.06 | 0.06 |
| | EP-7025 | | | | | |
| Pure Water | | Balance | Balance | Balance | Balance | Balance |
| Total | | 100 | 100 | 100 | 100 | 100 |
| Total Amount of Hydrosoluble Organic Material | | 59.06 | 45.06 | 59.06 | 44.06 | 50.06 |

| | | 6 | | | | |
|---|---|---|---|---|---|---|
| | | Ex. 20 | Ex. 21 | Ex. 22 | Ex. 23 | Ex. 24 |
| Pigment Dispersion | Preparation Example 1 (Black) | | | | | |
| | Preparation Example 2 (Magenta) | | | | | |
| | Preparation Example 3 (Cyan) | 5 | 5 | 5 | 5 | 5 |
| | Preparation Example 4 (Yellow) | | | | | |
| | Preparation Example 5 (Magenta) | | | | | |
| | Preparation Example 6 (Cyan) | | | | | |
| | Preparation Example 7 (Yellow) | | | | | |
| | Preparation Example 8 (Black) | | | | | |
| | SENSIJET SMART Magenta 3122BA | | | | | |
| | SENSIJET SMART Cyan 3154BA | | | | | |
| | SENSIJET SMART Yellow 3074BA | | | | | |
| | SENSIJET Black SDP2000 | | | | | |
| | Black CAB-O-JET 300 | | | | | |
| | Cyan CAB-O-JET 250 | | | | | |
| | Magenta CAB-O-JET 260 | | | | | |
| | Yellow CAB-O-JET 270 | | | | | |
| Resin Dispersion | Acrylic-silicone resin emulsion | 2 | 2 | 2 | | 2 |
| | Polyurethane resin emulsion | | | | 2 | |
| Moisturizer | 3-methoxy-1-butanol | 25 | 25 | 25 | 25 | 25 |
| | 3-methoxy-1-methyl butanol | | | | | |
| | 1,2-butane diol | 5 | | | | |
| Surfactant | ECTD-3NEX | | | 1.00 | | |
| | DSN403N | 0.06 | 0.06 | | | 0.06 |
| | EP-7025 | | | | 0.50 | |
| Pure Water | | Balance | Balance | Balance | Balance | Balance |
| Total | | 100 | 100 | 100 | 100 | 100 |
| Total Amount of Hydrosoluble Organic Material | | 59.06 | 45.06 | 59.06 | 44.06 | 50.06 |

| | | 7 | | | | |
|---|---|---|---|---|---|---|
| | | Ex. 25 | Ex. 26 | Ex. 27 | Ex. 28 | Ex. 29 |
| Pigment Dispersion | Preparation Example 1 (Black) | | | | | |
| | Preparation Example 2 (Magenta) | | 5 | 5 | 5 | 5 |
| | Preparation Example 3 (Cyan) | 5 | | | | |
| | Preparation Example 4 (Yellow) | | | | | |
| | Preparation Example 5 (Magenta) | | | | | |
| | Preparation Example 6 (Cyan) | | | | | |
| | Preparation Example 7 (Yellow) | | | | | |

TABLE 1-continued

| | | | | | | |
|---|---|---|---|---|---|---|
| | Preparation Example 8 (Black) | | | | | |
| | SENSIJET SMART Magenta 3122BA | | | | | |
| | SENSIJET SMART Cyan 3154BA | | | | | |
| | SENSIJET SMART Yellow 3074BA | | | | | |
| | SENSIJET Black SDP2000 | | | | | |
| | Black CAB-O-JET 300 | | | | | |
| | Cyan CAB-O-JET 250 | | | | | |
| | Magenta CAB-O-JET 260 | | | | | |
| | Yellow CAB-O-JET 270 | | | | | |
| Resin Dispersion | Acrylic-silicone resin emulsion | 2 | | 2 | | 2 |
| | Polyurethane resin emulsion | | 2 | | 2 | |
| Moisturizer | 3-methoxy-1-butanol | 25 | 25 | 25 | 25 | 25 |
| | 3-methoxy-1-methyl butanol | | | | | |
| | 1,2-butane diol | 10 | 3 | 5 | | |
| Surfactant | ECTD-3NEX | 1.00 | | | | |
| | DSN403N | | 0.06 | 0.06 | 0.06 | 0.06 |
| | EP-7025 | | | | | |
| Pure Water | | Balance | Balance | Balance | Balance | Balance |
| Total | | 100 | 100 | 100 | 100 | 100 |
| Total Amount of Hydrosoluble Organic Material | | 50.00 | 50.06 | 50.06 | 49.06 | 49.06 |

| | | 8 | | | | |
|---|---|---|---|---|---|---|
| | | Ex. 30 | Ex. 31 | Ex. 32 | Ex. 33 | Com. Ex. 7 |
| Pigment Dispersion | Preparation Example 1 (Black) | 5 | | | | |
| | Preparation Example 2 (Magenta) | | 5 | | | |
| | Preparation Example 3 (Cyan) | | | 5 | | |
| | Preparation Example 4 (Yellow) | | | | 5 | |
| | Preparation Example 5 (Magenta) | | | | | 7 |
| | Preparation Example 6 (Cyan) | | | | | |
| | Preparation Example 7 (Yellow) | | | | | |
| | Preparation Example 8 (Black) | | | | | |
| | SENSIJET SMART Magenta 3122BA | | | | | |
| | SENSIJET SMART Cyan 3154BA | | | | | |
| | SENSIJET SMART Yellow 3074BA | | | | | |
| | SENSIJET Black SDP2000 | | | | | |
| | Black CAB-O-JET 300 | | | | | |
| | Cyan CAB-O-JET 250 | | | | | |
| | Magenta CAB-O-JET 260 | | | | | |
| | Yellow CAB-O-JET 270 | | | | | |
| Resin Dispersion | Acrylic-silicone resin emulsion | 2 | 2 | 2 | 2 | |
| | Polyurethane resin emulsion | | | | | |

TABLE 1-continued

| | | | | | | |
|---|---|---|---|---|---|---|
| Moisturizer | 3-methoxy-1-butanol | 25 | 25 | 25 | 25 | 25 |
| | 3-methoxy-1-methyl butanol | | | | | |
| | 1,2-butane diol | 24 | 24 | 24 | 24 | 24 |
| Surfactant | ECTD-3NEX | | | | | |
| | DSN403N | 0.06 | 0.06 | 0.06 | 0.06 | 0.06 |
| | EP-7025 | | | | | |
| Pure Water | | Balance | Balance | Balance | Balance | Balance |
| Total | | 100 | 100 | 100 | 100 | 100 |
| Total Amount of Hydrosoluble Organic Material | | 49.06 | 49.06 | 49.06 | 49.06 | 49.06 |

| | | 9 | | | | |
|---|---|---|---|---|---|---|
| | | Com. Ex. 8 | Com. Ex. 9 | Com. Ex. 10 | Com. Ex. 11 | Com. Ex. 12 |
| Pigment Dispersion | Preparation Example 1 (Black) | | | | | |
| | Preparation Example 2 (Magenta) | | | | | |
| | Preparation Example 3 (Cyan) | | | | | |
| | Preparation Example 4 (Yellow) | | | | | |
| | Preparation Example 5 (Magenta) | 7 | | | | |
| | Preparation Example 6 (Cyan) | | 7 | | | |
| | Preparation Example 7 (Yellow) | | | 7 | | |
| | Preparation Example 8 (Black) | | | | | |
| | SENSIJET SMART Magenta 3122BA | | | | 5 | |
| | SENSIJET SMART Cyan 3154BA | | | | | 5 |
| | SENSIJET SMART Yellow 3074BA | | | | | |
| | SENSIJET Black SDP2000 | | | | | |
| | Black CAB-O-JET 300 | | | | | |
| | Cyan CAB-O-JET 250 | | | | | |
| | Magenta CAB-O-JET 260 | | | | | |
| | Yellow CAB-O-JET 270 | | | | | |
| Resin Dispersion | Acrylic-silicone resin emulsion | | | | 2 | 2 |
| | Polyurethane resin emulsion | | | | | |
| Moisturizer | 3-methoxy-1-butanol | 25 | 25 | 25 | 25 | 25 |
| | 3-methoxy-1-methyl butanol | | | | | |
| | 1,2-butane diol | 24 | 24 | 24 | 24 | 24 |
| Surfactant | ECTD-3NEX | | | | | |
| | DSN403N | 0.06 | 0.06 | 0.06 | 0.06 | 0.06 |
| | EP-7025 | | | | | |
| Pure Water | | Balance | Balance | Balance | Balance | Balance |
| Total | | 100 | 100 | 100 | 100 | 100 |
| Total Amount of Hydrosoluble Organic Material | | 49.06 | 49.06 | 49.06 | 49.06 | 49.06 |

| | | 10 | | | | |
|---|---|---|---|---|---|---|
| | | Com. Ex. 13 | Com. Ex. 14 | Com. Ex. 15 | Com. Ex. 16 | Com. Ex. 17 |
| Pigment Dispersion | Preparation Example 1 (Black) | | | 5 | | |
| | Preparation Example 2 (Magenta) | | | | 5 | |
| | Preparation Example 3 (Cyan) | | | | | 5 |
| | Preparation Example 4 (Yellow) | | | | | |

TABLE 1-continued

|  |  |  |  |  |  |  |
|---|---|---|---|---|---|---|
|  | Preparation Example 5 (Magenta) |  |  |  |  |  |
|  | Preparation Example 6 (Cyan) |  |  |  |  |  |
|  | Preparation Example 7 (Yellow) |  |  |  |  |  |
|  | Preparation Example 8 (Black) |  |  |  |  |  |
|  | SENSIJET SMART Magenta 3122BA |  |  |  |  |  |
|  | SENSIJET SMART Cyan 3154BA |  |  |  |  |  |
|  | SENSIJET SMART Yellow 3074BA | 5 |  |  |  |  |
|  | SENSIJET Black SDP2000 |  | 5 |  |  |  |
|  | Black CAB-O-JET 300 |  |  |  |  |  |
|  | Cyan CAB-O-JET 250 |  |  |  |  |  |
|  | Magenta CAB-O-JET 260 |  |  |  |  |  |
|  | Yellow CAB-O-JET 270 |  |  |  |  |  |
| Resin Dispersion | Acrylic-silicone resin emulsion | 2 | 2 | 2 | 2 | 2 |
|  | Polyurethane resin emulsion |  |  |  |  |  |
| Moisturizer | 3-methoxy-1-butanol | 25 | 25 |  |  |  |
|  | 3-methoxy-1-methyl butanol |  |  | 25 | 25 | 25 |
|  | 1,2-butanediol | 24 | 24 | 24 | 24 | 24 |
| Surfactant | ECTD-3NEX |  |  |  |  |  |
|  | DSN403N | 0.06 | 0.06 | 0.06 | 0.06 | 0.06 |
|  | EP-7025 |  |  |  |  |  |
| Pure Water |  | Balance | Balance | Balance | Balance | Balance |
| Total |  | 100 | 100 | 100 | 100 | 100 |
| Total Amount of Hydrosoluble Organic Material |  | 49.06 | 49.06 | 49.06 | 49.06 | 49.06 |

|  |  | 11 |  |  |  |  |
|---|---|---|---|---|---|---|
|  |  | Com. Ex. 18 | Com. Ex. 19 | Com. Ex. 20 | Com. Ex. 21 | Com. Ex. 22 |
| Pigment Dispersion | Preparation Example 1 (Black) |  |  |  |  |  |
|  | Preparation Example 2 (Magenta) |  |  |  |  |  |
|  | Preparation Example 3 (Cyan) |  |  |  |  |  |
|  | Preparation Example 4 (Yellow) | 5 |  |  |  |  |
|  | Preparation Example 5 (Magenta) |  |  |  |  |  |
|  | Preparation Example 6 (Cyan) |  |  |  |  |  |
|  | Preparation Example 7 (Yellow) |  |  |  |  |  |
|  | Preparation Example 8 (Black) |  |  |  |  |  |
|  | SENSIJET SMART Magenta 3122BA |  |  |  |  |  |
|  | SENSIJET SMART Cyan 3154BA |  |  |  |  |  |
|  | SENSIJET SMART Yellow 3074BA |  |  |  |  |  |
|  | SENSIJET Black SDP2000 |  |  |  |  |  |
|  | Black CAB-O-JET 300 |  | 7 |  |  |  |
|  | Cyan CAB-O-JET 250 |  |  | 5 |  |  |
|  | Magenta CAB-O-JET 260 |  |  |  | 5 |  |
|  | Yellow CAB-O-JET 270 |  |  |  |  | 5 |

TABLE 1-continued

|  |  |  |  |  |  |  |
|---|---|---|---|---|---|---|
| Resin Dispersion | Acrylic-silicone resin emulsion | 2 | 2 | 2 | 2 | 2 |
|  | Polyurethane resin emulsion |  |  |  |  |  |
| Moisturizer | 3-methoxy-1-butanol |  | 15 | 15 | 15 | 15 |
|  | 3-methoxy-1-methyl butanol | 25 |  |  |  |  |
|  | 1,2-butane diol | 24 | 34 | 34 | 34 | 34 |
| Surfactant | ECTD-3NEX |  |  |  |  |  |
|  | DSN403N | 0.06 | 0.06 | 0.06 | 0.06 | 0.06 |
|  | EP-7025 |  |  |  |  |  |
| Pure Water |  | Balance | Balance | Balance | Balance | Balance |
| Total |  | 100 | 100 | 100 | 100 | 100 |
| Total Amount of Hydrosoluble Organic Material |  | 49.06 | 49.06 | 49.06 | 49.06 | 49.06 |

| | | 12 | | | | |
|---|---|---|---|---|---|---|
| | | Com. Ex. 23 | Com. Ex. 24 | Com. Ex. 25 | Com. Ex. 26 | Com. Ex. 27 |
| Pigment Dispersion | Preparation Example 1 (Black) |  |  |  |  |  |
|  | Preparation Example 2 (Magenta) |  |  |  |  |  |
|  | Preparation Example 3 (Cyan) |  |  |  |  |  |
|  | Preparation Example 4 (Yellow) |  |  |  | 5 |  |
|  | Preparation Example 5 (Magenta) | 5 |  |  |  |  |
|  | Preparation Example 6 (Cyan) |  |  |  |  |  |
|  | Preparation Example 7 (Yellow) |  |  |  |  |  |
|  | Preparation Example 8 (Black) |  |  |  |  |  |
|  | SENSIJET SMART Magenta 3122BA |  |  |  |  | 5 |
|  | SENSIJET SMART Cyan 3154BA |  | 5 |  |  |  |
|  | SENSIJET SMART Yellow 3074BA |  |  |  |  |  |
|  | SENSIJET Black SDP2000 |  |  |  |  |  |
|  | Black CAB-O-JET 300 |  |  |  |  |  |
|  | Cyan CAB-O-JET 250 |  |  | 5 |  |  |
|  | Magenta CAB-O-JET 260 |  |  |  |  |  |
|  | Yellow CAB-O-JET 270 |  |  |  |  |  |
| Resin Dispersion | Acrylic-silicone resin emulsion |  | 2 | 2 |  | 2 |
|  | Polyurethane resin emulsion |  |  |  |  |  |
| Moisturizer | 3-methoxy-1-butanol | 8 | 8 | 8 | 8 | 8 |
|  | 3-methoxy-1-methyl butanol |  |  |  |  |  |
|  | 1,2-butane diol | 41 | 41 | 41 | 41 | 41 |
| Surfactant | ECTD-3NEX |  |  |  |  |  |
|  | DSN403N | 0.06 | 0.06 | 0.06 | 0.06 | 0.06 |
|  | EP-7025 |  |  |  |  |  |
| Pure Water |  | Balance | Balance | Balance | Balance | Balance |
| Total |  | 100 | 100 | 100 | 100 | 100 |
| Total Amount of Hydrosoluble Organic Material |  | 49.06 | 49.06 | 49.06 | 49.06 | 49.06 |

| | | 13 |
|---|---|---|
| | | Com. Ex. 28 |
| Pigment Dispersion | Preparation Example 1 (Black) |  |
|  | Preparation Example 2 (Magenta) |  |

TABLE 1-continued

|  |  |  |
|---|---|---|
|  | Preparation Example 3 (Cyan) |  |
|  | Preparation Example 4 (Yellow) |  |
|  | Preparation Example 5 (Magenta) |  |
|  | Preparation Example 6 (Cyan) |  |
|  | Preparation Example 7 (Yellow) |  |
|  | Preparation Example 8 (Black) |  |
|  | SENSIJET SMART Magenta 3122BA |  |
|  | SENSIJET SMART Cyan 3154BA |  |
|  | SENSIJET SMART Yellow 3074BA |  |
|  | SENSIJET Black SDP2000 |  |
|  | Black CAB-O-JET 300 |  |
|  | Cyan CAB-O-JET 250 |  |
|  | Magenta CAB-O-JET 260 | 5 |
|  | Yellow CAB-O-JET 270 |  |
| Resin Dispersion | Acrylic-silicone resin emulsion | 2 |
|  | Polyurethane resin emulsion |  |
| Moisturizer | 3-methoxy-1-butanol | 8 |
|  | 3-methoxy-1-methyl butanol |  |
|  | 1,2-butane diol | 41 |
| Surfactant | ECTD-3NEX |  |
|  | DSN403N | 0.06 |
|  | EP-7025 |  |
| Pure Water |  | Balance |
| Total |  | 100 |
| Total Amount of Hydrosoluble Organic Material |  | 49.06 |

\* SENSIJET SMART Magenta 3122BA: Surface-treated pigment dispersion from Sensient Technologies Corp.
\* SENSIJET SMART Cyan 3154BA: Surface-treated pigment dispersion from Sensient Technologies Corp.
\* SENSIJET SMART Yellow 3074BA: Surface-treated pigment dispersion from Sensient Technologies Corp.
\* SENSIJET Black SDP2000: Surface-treated pigment dispersion from Sensient Technologies Corp.
\* CAB-O-JET 300: Black surface-treated pigment dispersion from Cabot Corp.
\* CAB-O-JET 250: Cyan surface-treated pigment dispersion from Cabot Corp.
\* CAB-O-JET 260: Magenta surface-treated pigment dispersion from Cabot Corp.
\* CAB-O-JET 270: Yellow surface-treated pigment dispersion from Cabot Corp.
\* Acrylic-silicone resin emulsion: (POLYSOL ® ROY6312, a solid content of 40% by weight, an average particle diameter of 171 nm, a minimum film-forming temperature (MFT) = 20° C., manufactured by SHOWA HIGHPOLYMER CO., LTD.).
\* Polyurethane resin emulsion: HYDRAN APX-101H, solid portion of 45% by weight, average particle diameter of 160 nm, a minimum film-forming temperature (MFT) = 20° C., manufactured by DIC Corporation).
\* DSN403N: Fluorine-containing surfactant (effective component: 98% by weight or more, manufactured by DAIKIN INDUSTRIES, ltd.)
\* SOFTANOL EP-7025: polyoxyalkylene alkyl ether (component 100% by weight, manufactured by NIPPON SHOKUBAI CO., LTD.)
\* NIKKOL ETCD-3NEX: polyoxyethylene (3) tridecyl ether sodium acetate (effective component: 98% by weight, manufactured by Nikko Chemicals Co., Ltd.)

[Evaluation Items/Evaluation Method]

<Ink Viscosity>

The viscosity of an ink was measured with a viscometer RL-500 from Toki Sangyo Co., Ltd. at 25° C.

<Storage Stability>

Each ink was left still in a constant tank at 65° C. for four weeks. The viscosity change rate of the ink before and after storage at the constant tank followed by evaluation according to the following standard.

A: Viscosity Variation: less than 5%

B: Viscosity Variation: Not less than 5% and to less than 10%

C: Viscosity Variation: Not less than 10%

—Preparation of Print Quality Evaluation—

Each of the inks was ejected by an inkjet printer (IPSIO GXe 5500 from Ricoh Co., Ltd.) under environmental conditions of 23±0.5° C. and 50±5% RH. In this regard, the driving voltage of the piezoelectric element was changed so that the amounts of the ejected inks are equal, and therefore the inks adhered to a recording medium in the same amounts.

Each color of a chart made by Microsoft Word 2000 used the following RGB. The printer was set to print without color matching to print with a single ink using the following RGB Yellow, Magenta and Cyan. In the plain paper mode, the printer was set to print without color matching to print Black with a single ink using the following RGB Black, Yellow, Magenta and Cyan. In the glossy paper mode, the printer was set to print without color matching to print with a single ink using the following RGB Yellow, Magenta and Cyan. In the glossy paper mode, the printer was set to black and white to print Black with a single ink.

A square solid image having a size of 200 mm×100 mm made by Microsoft Word 2000 was printed on Superfine Paper (KA4250SFR) from Seiko Epson Corp. to measure an adherence amount. The adherence amount was adjusted to be 9.17±0.5 g/m².

[Color Designation of Microsoft Word]
 RGB color model
 Black: Red (R) 0, Green (G) 0, Blue (B) 0
 Yellow: Red (R) 255, Green (G) 255, Blue (B) 0
 Magenta: Red (R) 255, Green (G) 0, Blue (B) 255
 Cyan: Red (R) 0, Green (G) 0, Blue (B) 255
 Red: Red (R) 255, Green (G) 0, Blue (B) 0
 Green: Red (R) 0, Green (G) 255, Blue (B) 0
 Blue: Red (R) 0, Green (G) 0, Blue (B) 255

<Offset (Retransferability of Ink)>

The retransferability of ink was used to evaluate drying properties. Retransferability of ink is a phenomenon that if ink is attached to a recording medium to form an image and remains on the surface thereof in a large amount, the ink on the surface of the recording medium attaches to and contaminates a device such as a transfer roller when the printed surface of the image contacts the device while the recording medium is being transferred in the transfer path.

A square solid image of each color made by Microsoft Word 2000 was printed in a recording medium. Thirty (30) sec later, a cylindrical roller made of polyethylene, having a diameter of 40 mm was rolled on the square solid image having a length of 40 mm while pressed thereto at 5N. The cylindrical roller the ink was retransferred to was measured by X-Rite 939 to evaluate according to the following standard. The printing mode was glossy paper—fast without color matching. Black was printed by glossy paper—fast and black and white mode. LUMIART from STORA ENSO was used as a recording medium. The square solid chart was a square having a size of 40 mm×40 mm made by Microsoft Word 2000 without lines. The painted color was Black, Yellow, Magenta and Cyan.

[Evaluation Standard]
 A: Less than 0.10
 B: Not less than 0.10 and less than 0.2
 C: Not less than 0.2

<Beading>

A square solid chart was formed on LUMIART from STORA ENSO as above to visually observe the chart.

[Evaluation Standard]
 A: Image had unevenness.
 B: Image had slight unevenness, but practicable.
 C: Image had unevenness over the entire surface.

<Discharge Stability>

A solid chart covering 5% of the area of A4 paper per color, drawn by Microsoft Word 2000, was continuously printed with a run length of 200 sheets and disturbance of ink discharging by each nozzle was evaluated after the printing according to the following criteria. The printing mode used was modified from "Plain Paper—Fast" to "no color matching" on the user setting for plain paper by the driver installed onto the printer. The evaluation was made at 22° C. to 24° C. and a humidity of from 45% RH to 55% RH.

[Evaluation Standard]
 A: No discharge disturbance
 B: Slight discharge disturbance
 C: Not discharged from some nozzles <Intermittent Dischargeability>

After left still in an environment of 34° C. to 36° C. and 10% RH to 20% RH for two hours after head cleaning, a solid chart covering 5% of the area of A4 paper per color, drawn by Microsoft Word 2000, was printed on one sheet (My Paper which is quality paper having a weight of 69.6 g/m² from NBS RICOH CO., LTD.) and disturbance of ink discharging by each nozzle was evaluated. The printing mode used was: a modified mode in which "Plain Paper—Fast" was modified to "no color matching" from a user setting for plain paper by a driver installed onto the printer.

[Evaluation Standard]
 A: No discharge disturbance
 B: Slight discharge disturbance
 C: Not discharged from some nozzles <Color Bleed>

A color bleed chart of each color made by Microsoft Word 2000 was formed on LUMIART from STORA ENSO. The printing mode used was modified from "Gloss Paper—Fast" to "no color matching" on the user setting for plain paper by the driver installed onto the printer. The color bleed chart included adjacent squares having a size of 13 mm×13 mm of Yellow, Magenta, Cyan, Red, Green, Blue and Black, and em "A" was printed in each of the squares.

Figure 6:
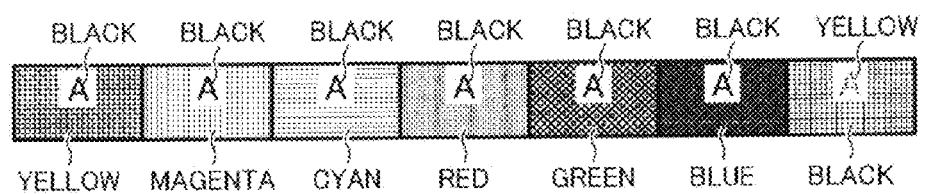
FIG. 6 is a square chart including colors of Yellow, Magenta, Cyan, Red, Green, Blue and Black.

As FIG. 6 shows, the square chart had a size of 40 mm×40 mm formed of each painted color of Yellow, Magenta, Cyan, Red, Green, Blue and Black without lines.

[Evaluation Standard]
 A: No bleeding at each letter and border
 B: Bleeding not less than 0.2 mm and less than 1 mm at each letter and border
 C: Bleeding not less than 1 mm at each letter and border <Image Density>

A "square solid chart" having 64 point texts prepared by Microsoft Word 2000 was output on the recording medium and thereafter the color of the "square solid chart" portion of the printed surface was measured by X-Rite 938 The printing mode is: "Plain Paper—Fast" by a driver installed onto the printer with the color matching off

[Evaluation Standard]
 Good: Image density not less than 1.20
 Poor: Image density less than 1.20

The results are shown in Table 2.

TABLE 2

|  | 1 | | | | | |
| --- | --- | --- | --- | --- | --- | --- |
|  | Hydrosoluble organic Material (% by weight) | Viscosity (mPas) | Methoxy Butanol (% by weight) | Diols (% by weight) | Pigment Surface | Color |
| Example 1 | 49.06 | 8.5 | 8 | 41 | A | C |
| Example 2 | 49.06 | 8.4 | 10 | 39 | A | C |
| Example 3 | 49.06 | 8.2 | 15 | 34 | A | C |
| Example 4 | 49.06 | 7.2 | 40 | 9 | A | C |
| Example 5 | 59.06 | 8.2 | 59 | 0 | A | C |

TABLE 2-continued

| | | | | | | |
|---|---|---|---|---|---|---|
| Comparative Example 1 | 65.06 | 9.0 | 65 | 0 | A | C |
| Comparative Example 2 | 33.06 | 4.9 | 25 | 8 | A | C |
| Example 6 | 35.06 | 5.3 | 25 | 10 | A | C |
| Example 7 | 59.06 | 9.6 | 25 | 34 | A | C |
| Comparative Example 3 | 63.06 | 10.3 | 25 | 38 | A | C |
| Example 8 | 49.06 | 8.5 | 8 | 41 | A | M |
| Example 9 | 49.06 | 8.4 | 10 | 39 | A | M |
| Example 10 | 49.06 | 8.2 | 15 | 34 | A | M |
| Example 11 | 49.06 | 7.2 | 40 | 9 | A | M |
| Example 12 | 59.06 | 8.2 | 59 | 0 | A | M |
| Comparative Example 4 | 65.06 | 9.0 | 65 | 0 | A | M |
| Comparative Example 5 | 33.06 | 4.9 | 25 | 8 | A | M |
| Example 13 | 35.6 | 5.3 | 25 | 10 | A | M |
| Example 14 | 59.06 | 9.6 | 25 | 34 | A | M |
| Comparative Example 6 | 63.06 | 10.5 | 25 | 38 | A | M |
| Example 15 | 59.06 | 8.2 | 25 | 34 | A | C |
| Example 16 | 45.06 | 8.1 | 25 | 20 | A | C |
| Example 17 | 59.06 | 8.2 | 25 | 34 | A | M |
| Example 18 | 44.06 | 7.9 | 25 | 19 | A | M |
| Example 19 | 50.06 | 8.0 | 25 | 3 | A | C |
| Example 20 | 50.06 | 8.0 | 25 | 5 | A | C |
| Example 21 | 49.06 | 7.8 | 25 | 24 | A | C |
| Example 22 | 50 | 8.1 | 25 | 24 | A | C |
| Example 23 | 49.5 | 7.8 | 25 | 24 | A | C |
| Example 24 | 49.06 | 8.0 | 25 | 24 | A | C |
| Example 25 | 50 | 7.8 | 25 | 24 | A | C |
| Example 26 | 50.06 | 8.0 | 25 | 3 | A | M |
| Example 27 | 50.06 | 8.0 | 25 | 5 | A | M |
| Example 28 | 49.06 | 7.8 | 25 | 24 | A | M |
| Example 29 | 49.06 | 7.9 | 25 | 24 | A | M |
| Example 30 | 49.06 | 8.3 | 25 | 24 | A | Bk |
| Example 31 | 49.06 | 7.8 | 25 | 24 | A | M |
| Example 32 | 49.06 | 8.2 | 25 | 24 | A | C |
| Example 33 | 49.06 | 8.1 | 25 | 24 | A | Y |
| Comparative Example 7 | 49.06 | 7.6 | 25 | 24 | B | M |
| Comparative Example 8 | 49.06 | 7.8 | 25 | 24 | B | C |
| Comparative Example 9 | 49.06 | 8.1 | 25 | 24 | B | Y |
| Comparative Example 10 | 49.06 | 8.0 | 25 | 24 | B | Bk |
| Comparative Example 11 | 49.06 | 8.5 | 25 | 24 | C | M |
| Comparative Example 12 | 49.06 | 8.7 | 25 | 24 | C | C |
| Comparative Example 13 | 49.06 | 8.4 | 25 | 24 | C | Y |
| Comparative Example 14 | 49.06 | 9.0 | 25 | 24 | C | Bk |
| Comparative Example 15 | 49.06 | 8.5 | 0 | 24 | A | Bk |
| Comparative Example 16 | 49.06 | 8.2 | 0 | 24 | A | M |
| Comparative Example 17 | 49.06 | 8.4 | 0 | 24 | A | Y |
| Comparative Example 18 | 49.06 | 8.2 | 0 | 24 | A | C |
| Comparative Example 19 | 49.06 | 8.2 | 15 | 24 | D | M |
| Comparative Example 20 | 49.06 | 7.8 | 15 | 24 | D | C |
| Comparative Example 21 | 49.06 | 8.1 | 15 | 24 | D | Y |
| Comparative Example 22 | 49.06 | 8.0 | 15 | 24 | D | Bk |
| Comparative Example 23 | 49.06 | 8.5 | 8 | 24 | B | C |
| Comparative Example 24 | 49.06 | 8.5 | 8 | 24 | C | C |
| Comparative Example 25 | 49.06 | 8.0 | 8 | 24 | D | C |
| Comparative Example 26 | 49.06 | 9.0 | 8 | 24 | B | M |

TABLE 2-continued

| | | | | | | | |
|---|---|---|---|---|---|---|---|
| Comparative Example 27 | 49.06 | 8.4 | 8 | 24 | C | M | |
| Comparative Example 28 | 49.06 | 9.0 | 8 | 24 | D | M | |

2

| | Offset | Beading | Discharge Stability | Intermittent Dischargeability | Storage Stability | Image Density |
|---|---|---|---|---|---|---|
| Example 1 | B | B | A | A | A | Good |
| Example 2 | B | A | A | A | A | Good |
| Example 3 | A | A | A | A | A | Good |
| Example 4 | A | A | A | A | A | Good |
| Example 5 | A | A | A | B | B | Good |
| Comparative Example 1 | C | B | B | C | B | Good |
| Comparative Example 2 | B | B | B | C | A | Good |
| Example 6 | A | A | A | A | A | Good |
| Example 7 | A | A | A | A | A | Good |
| Comparative Example 3 | A | B | B | C | A | Good |
| Example 8 | B | B | A | A | A | Good |
| Example 9 | B | A | A | A | A | Good |
| Example 10 | A | A | A | A | A | Good |
| Example 11 | A | A | A | A | A | Good |
| Example 12 | A | A | A | B | B | Good |
| Comparative Example 4 | B | B | B | C | B | Good |
| Comparative Example 5 | B | B | B | C | A | Good |
| Example 13 | A | A | A | A | A | Good |
| Example 14 | A | A | A | A | A | Good |
| Comparative Example 6 | A | B | C | B | A | Good |
| Example 15 | A | A | A | A | A | Good |
| Example 16 | A | A | A | A | A | Good |
| Example 17 | A | A | A | A | A | Good |
| Example 18 | A | A | A | A | A | Good |
| Example 19 | A | A | A | B | B | Good |
| Example 20 | A | A | A | A | A | Good |
| Example 21 | A | A | A | A | A | Good |
| Example 22 | A | A | A | A | A | Good |
| Example 23 | A | A | A | A | A | Good |
| Example 24 | A | A | A | A | A | Good |
| Example 25 | A | A | A | A | A | Good |
| Example 26 | A | A | A | B | B | Good |
| Example 27 | A | A | A | A | A | Good |
| Example 28 | A | A | A | A | A | Good |
| Example 29 | A | A | A | A | A | Good |
| Example 30 | A | A | A | A | A | Good |
| Example 31 | A | A | A | A | A | Good |
| Example 32 | A | A | A | A | A | Good |
| Example 33 | A | A | A | A | A | Good |
| Comparative Example 7 | A | B | A | A | A | Poor |
| Comparative Example 8 | A | B | A | A | A | Poor |
| Comparative Example 9 | A | B | A | A | A | Poor |
| Comparative Example 10 | A | A | A | A | A | Poor |
| Comparative Example 11 | A | B | B | B | C | Poor |
| Comparative Example 12 | A | B | C | B | B | Poor |
| Comparative Example 13 | A | B | B | B | B | Poor |
| Comparative Example 14 | A | A | B | B | C | Poor |
| Comparative Example 15 | A | A | A | B | B | Poor |
| Comparative Example 16 | A | B | A | A | B | Poor |
| Comparative Example 17 | A | B | A | A | B | Poor |
| Comparative Example 18 | A | B | A | A | B | Poor |

TABLE 2-continued

| | | | | | | |
|---|---|---|---|---|---|---|
| Comparative Example 19 | A | B | A | A | B | Poor |
| Comparative Example 20 | A | B | A | A | B | Poor |
| Comparative Example 21 | A | B | A | A | B | Poor |
| Comparative Example 22 | A | A | A | A | B | Poor |
| Comparative Example 23 | B | C | A | A | A | Good |
| Comparative Example 24 | B | C | B | B | C | Good |
| Comparative Example 25 | B | C | A | A | B | Good |
| Comparative Example 26 | B | C | A | A | A | Good |
| Comparative Example 27 | B | C | B | B | C | Good |
| Comparative Example 28 | B | C | A | A | B | Good |

*Pigment Surface;
A: Geminal bisphosphonic acid group
B: Polymeric particles
C: Oxidized
D: Other surface treatment
*Color
Bk: Black
Y: Yellow
M: Magenta
C: Cyan Examples 34 to 36 and Comparative Examples 29 to 33 shown in Table 3 are ink sets including the inks of the above Examples and Comparative Examples. Evaluation results of their color bleed are shown therein.

TABLE 3

| | | Bk | Y | M | C | Color bleed |
|---|---|---|---|---|---|---|
| Example 34 | Ink Set 1 | Ex. 30 | Ex. 33 | Ex. 31 | Ex. 32 | A |
| Comparative Example 29 | Ink Set 2 | Com. Ex. 10 | Com. Ex. 9 | Com. Ex. 8 | Com. Ex. 7 | C |
| Comparative Example 30 | Ink Set 3 | Com. Ex. 14 | Com. Ex. 13 | Com. Ex. 11 | Com. Ex. 12 | C |
| Comparative Example 31 | Ink Set 4 | Com. Ex. 15 | Com. Ex. 17 | Com. Ex. 16 | Com. Ex. 18 | C |
| Example 35 | Ink Set 5 | Com. Ex. 15 | Ex. 33 | Ex. 31 | Ex. 32 | B |
| Comparative Example 32 | Ink Set 6 | Com. Ex. 15 | Com. Ex. 9 | Com. Ex. 8 | Com. Ex. 7 | C |
| Comparative Example 33 | Ink Set 7 | Com. Ex. 15 | Com. Ex. 13 | Com. Ex. 11 | Com. Ex. 12 | C |
| Example 36 | Ink Set 8 | Ex. 30 | Com. Ex. 17 | Com. Ex. 16 | Com. Ex. 18 | B |

Having now fully described the invention, it will be apparent to one of ordinary skill in the art that many changes and modifications can be made thereto without departing from the spirit and scope of the invention as set forth therein.

What is claimed is:

1. An ink for inkjet, comprising water, a hydrosoluble organic material and a hydrodispersible colorant, wherein
   (A) the ink comprises the hydrosoluble organic material in an amount of from 35 to 60% by weight;
   (B) the hydrosoluble organic material is 3-methoxy-1-butanol; and
   (C) the hydrodispersible colorant is a modified pigment modified with a geminal bisphosphonic acid group represented by formula (I) or (II):

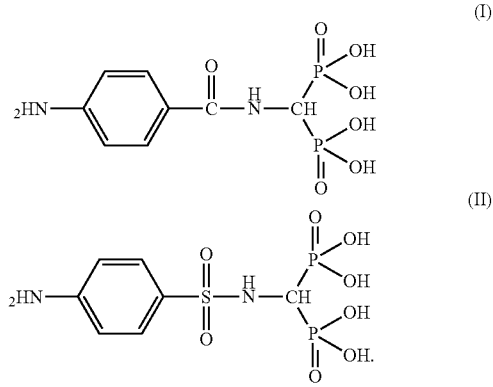

2. The ink for inkjet of claim 1, wherein the ink comprises 3-methoxy-1-butanol in an amount of from 15 to 40% by weight.

3. The ink for inkjet of claim 1, further comprising a member selected from the group consisting of 1,3-butanediol; 3-methyl-1,3-butandediol; 1,2-butanediol; 1,2-pentanediol; 2,3-butanediol; and 3-methyl-3-hydroxymethyloxetane in an amount of from 5 to 40% by weight.

4. An ink set comprising plural inks, wherein each of the inks is the ink for inkjet according to claim 1.

5. An ink cartridge comprising a container comprising the ink for inkjet according to claim 1.

6. An inkjet recorder, comprising:
   an ink container comprising the ink for inkjet according to claim 1; and
   an inkjet recording head configured to apply an energy to the ink to discharge the in the form of a droplet or a recording unit comprising the inkjet recording head.

7. An inkjet recorder, comprising:
   the ink cartridge according to claim 5; and
   an inkjet recording head configured to apply an energy to the ink to discharge the in the form of a droplet or a recording unit comprising the inkjet recording head.

8. Inkjet recording method, comprising:
applying an energy to the ink for inkjet according to claim 1 to discharge the ink on a recording medium.

9. An ink recorded matter, comprising:
a recording medium; and
a recorded image recorded with the ink for inkjet according to claim 1, located on the recording medium.

10. The ink for inkjet of claim 1, wherein
(C) the hydrodispersible colorant is a modified pigment modified with a geminal bisphosphonic acid group represented by formula (I):

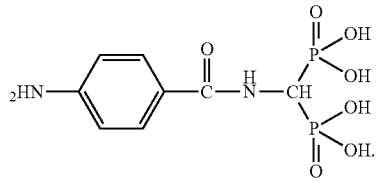

(I)

11. The ink for inkjet of claim 1, wherein (C) the hydrodispersible colorant is a modified pigment modified with a geminal bisphosphonic acid group represented by formula (II):

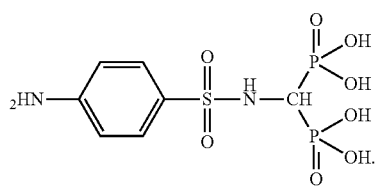

(II)

* * * * *